(12) United States Patent
Döring et al.

(10) Patent No.: US 12,169,121 B2
(45) Date of Patent: *Dec. 17, 2024

(54) USER INTERFACE FOR THREE-DIMENSIONAL MEASUREMENT DEVICE

(71) Applicant: FARO Technologies, Inc., Lake Mary, FL (US)

(72) Inventors: Daniel Döring, Ditzingen (DE); Rasmus Debitsch, Fellbach (DE); Rene Pfeiffer, Muehlacker (DE); Axel Ruhland, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,644

(22) Filed: Mar. 27, 2023

(65) Prior Publication Data

US 2023/0228557 A1   Jul. 20, 2023

Related U.S. Application Data

(63) Continuation of application No. 17/340,917, filed on Jun. 7, 2021, now Pat. No. 11,614,319.

(60) Provisional application No. 63/044,672, filed on Jun. 26, 2020.

(51) Int. Cl.
  *G06F 3/0481* (2022.01)
  *G01B 11/00* (2006.01)
  *G01B 11/25* (2006.01)

(52) U.S. Cl.
  CPC .......... *G01B 11/002* (2013.01); *G06F 3/0481* (2013.01); *G01B 11/2513* (2013.01); *G01B 11/2518* (2013.01); *G01B 11/2545* (2013.01)

(58) Field of Classification Search
  None
  See application file for complete search history.

(56) References Cited

U.S. PATENT DOCUMENTS

| | | | |
|---|---|---|---|
| 8,705,012 B2 | 4/2014 | Greiner et al. | |
| 9,629,004 B2 * | 4/2017 | Hassan | H04L 41/22 |
| 10,914,569 B2 | 2/2021 | Zweigle et al. | |
| 11,353,319 B2 * | 6/2022 | Laffargue | G01B 11/02 |
| 11,614,319 B2 | 3/2023 | Döring et al. | |

(Continued)

*Primary Examiner* — Tuyetlien T Tran
(74) *Attorney, Agent, or Firm* — McCarter & English, LLP; Dave S. Christensen

(57) ABSTRACT

A system and method for providing feedback on a quality of a 3D scan is provided. The system includes a coordinate scanner configured to optically measure and determine a plurality of three-dimensional coordinates to a plurality of locations on at least one surface in the environment, the coordinate scanner being configured to move through the environment while acquiring the plurality of three-dimensional coordinates. A display having a graphical user interface. One or more processors are provided that are configured to determine a quality attribute of a process of measuring the plurality of three-dimensional coordinates based at least in part on the movement of the coordinate scanner in the environment and display a graphical quality indicator on the graphical user interface based at least in part on the quality attribute, the quality indicator is a graphical element having at least one movable element.

13 Claims, 30 Drawing Sheets

(56) References Cited

U.S. PATENT DOCUMENTS

| | | | |
|---|---|---|---|
| 2006/0115113 A1* | 6/2006 | Lages | G01S 3/7864 |
| | | | 382/199 |
| 2010/0081942 A1* | 4/2010 | Huiku | G16H 40/60 |
| | | | 600/483 |
| 2010/0298718 A1* | 11/2010 | Gilham | A61B 5/0816 |
| | | | 600/484 |
| 2013/0190600 A1* | 7/2013 | Gupta | A61B 8/0866 |
| | | | 600/407 |
| 2016/0112643 A1* | 4/2016 | Laffargue | G06T 7/0002 |
| | | | 348/46 |
| 2017/0251143 A1* | 8/2017 | Peruch | H04N 13/257 |
| 2018/0108178 A1* | 4/2018 | Murugappan | G06F 30/00 |
| 2018/0130255 A1* | 5/2018 | Hazeghi | H04N 13/243 |
| 2018/0227570 A1* | 8/2018 | Page | G01B 11/2513 |
| 2018/0364033 A1* | 12/2018 | Döring | G01B 11/245 |
| 2019/0289201 A1* | 9/2019 | Nishimura | H04N 13/239 |
| 2019/0339057 A1* | 11/2019 | Laffargue | G06F 3/0484 |
| 2020/0109943 A1* | 4/2020 | Buback | G01C 21/206 |
| 2020/0167992 A1* | 5/2020 | Tran | G06T 7/97 |
| 2020/0292297 A1 | 9/2020 | Atala et al. | |
| 2020/0318955 A1* | 10/2020 | Sharapov | G01C 11/025 |
| 2021/0233288 A1* | 7/2021 | Hazen | G06F 3/0346 |
| 2021/0375064 A1* | 12/2021 | Döring | G06T 7/30 |

* cited by examiner

USER INTERFACE FOR THREE-DIMENSIONAL MEASUREMENT DEVICE

This application is a continuation application of U.S. patent application Ser. No. 17/340,917 filed on Jun. 7, 2021, which claims the benefit of U.S. Provisional Application Ser. No. 63/044,672 filed Jun. 26, 2020, the contents of both of which are incorporated herein by reference.

BACKGROUND

The subject matter disclosed herein relates to a handheld three-dimensional (3D) measurement device, and particularly to a movable scanning system.

A 3D measurement device, also referred to as a 3D triangulation scanner or a 3D imager, is a portable device having a projector that projects light patterns on the surface of an object to be scanned. One (or more) cameras, having a predetermined positions and alignment relative to the projector, records images of the light pattern on the surface of an object. The three-dimensional coordinates of elements in the light pattern can be determined by trigonometric methods, such as by using triangulation. Other types of 3D measuring devices may also be used to measure 3D coordinates, such as those that use time of flight techniques (e.g., laser trackers, laser scanners or time of flight cameras) for measuring the amount of time it takes for light to travel to the surface and return to the device.

It is desired to have a handheld 3D measurement device that is easier to use and that gives additional capabilities and performance. Typically, the 3D measurement device is moved during the scanning process, either carried by the operator or on a mobile platform. The rate or speed of movement impacts the quality of the scanning data. The faster the operator moves, the less data points may be acquired. While this may be acceptable in some situations, in other areas the lower density of scan data may result in a loss of tracking. Thus, the desired speed at which the scanner is moved through the environment may change during the course of the scan.

Accordingly, while existing handheld 3D measurement devices are suitable for their intended purposes, the need for improvement remains, particularly in providing a 3D measurement device that provides feedback to the user as described herein.

BRIEF DESCRIPTION

According to one aspect of the disclosure, a system is provided. The system comprising a coordinate scanner configured to optically measure and determine a plurality of three-dimensional coordinates to a plurality of locations on at least one surface in the environment, the coordinate scanner being configured to move through the environment while acquiring the plurality of three-dimensional coordinates. A display having a graphical user interface. One or more processors are provided that are configured to determine a quality attribute of a process of measuring the plurality of three-dimensional coordinates based at least in part on the movement of the coordinate scanner in the environment and display a graphical quality indicator on the graphical user interface based at least in part on the quality attribute, the quality indicator is a graphical element having at least one movable element.

In addition to one or more of the features described herein above, or as an alternative, further embodiments of the system may include the size of the movable element being based on the quality attribute. In addition to one or more of the features described herein above, or as an alternative, further embodiments of the system may include the at least one movable element having a plurality of stacked bars in the movable element. In addition to one or more of the features described herein above, or as an alternative, further embodiments of the system may include the movable element having a first bar and a second bar, the first bar indicating a speed of the coordinate scanner, the second bar indicating an age of the targets.

In addition to one or more of the features described herein above, or as an alternative, further embodiments of the system may include the graphical element further comprising a quality symbol, the at least one changeable bar indicating a first quality attribute, the quality symbol indicating a second quality attribute. In addition to one or more of the features described herein above, or as an alternative, further embodiments of the system may include the first quality attribute being based at least in part on the speed of the coordinate scanner, and the second quality attribute is based at least in part on a target attribute.

In addition to one or more of the features described herein above, or as an alternative, further embodiments of the system may include the target attribute being the age of the target. In addition to one or more of the features described herein above, or as an alternative, further embodiments of the system may include the graphical element further comprising a quality symbol, the one or more processors being further configured to change the quality symbol based on the quality attribute. In addition to one or more of the features described herein above, or as an alternative, further embodiments of the system may include the parameter being one of a length of the at least one movable element, a color of the at least one movable element, or a combination thereof.

In addition to one or more of the features described herein above, or as an alternative, further embodiments of the system may include: the graphical element being a first color when the process of measuring the plurality of three-dimensional coordinates with the coordinate scanner provides a density of the plurality of three-dimensional coordinates above a first threshold; the graphical element being a second color when the process of measuring the plurality of three-dimensional coordinates with the coordinate scanner provides the density of the plurality of three-dimensional coordinates below a second threshold; and the graphical element being a third color when the process of measuring the plurality of three-dimensional coordinates with the coordinate scanner provides the density of the plurality of three-dimensional coordinates being between the first threshold and the second threshold.

In addition to one or more of the features described herein above, or as an alternative, further embodiments of the system may include the first threshold and second threshold being based at least in part on the translational or rotational speed of movement of the coordinate scanner or an acquisition rate of the plurality of three-dimensional coordinates. In addition to one or more of the features described herein above, or as an alternative, further embodiments of the system may include the quality attribute being based at least in part on a translational speed of the coordinate scanner through the environment. In addition to one or more of the features described herein above, or as an alternative, further embodiments of the system may include the quality attribute being based at least in part on at least one of: a number of tracking targets; an age of the targets; a rotational speed of the coordinate scanner; a quality threshold of images used to track the coordinate scanner; a number of three-dimensional points acquired; a 3D geometry of the environment; a distance to the objects being scanned; and a level of noise in the plurality of three-dimensional coordinates.

In addition to one or more of the features described herein above, or as an alternative, further embodiments of the system may include the graphical user interface having a first portion and a second portion, the quality indicator being positioned in the first portion. In addition to one or more of the features described herein above, or as an alternative, further embodiments of the system may include the one or more processors being configured to display an image of the three-dimensional coordinates in the second portion. In addition to one or more of the features described herein above, or as an alternative, further embodiments of the system may include the one or more processors being configured to display a two-dimensional plan view of the environment in the second portion. In addition to one or more of the features described herein above, or as an alternative, further embodiments of the system may include the one or more processors being configured to determine a trajectory of the coordinate scanner and display the trajectory on the two-dimensional plan view.

In addition to one or more of the features described herein above, or as an alternative, further embodiments of the system may include the quality indicator instructs the operator to perform a stationary scan. In addition to one or more of the features described herein above, or as an alternative, further embodiments of the system may include the quality indicator instructs the operator to perform an anchor scan. In addition to one or more of the features described herein above, or as an alternative, further embodiments of the system may include the quality indicator instructs the operator to record an anchor object.

In addition to one or more of the features described herein above, or as an alternative, further embodiments of the system may include the one or more processors being further configured to determine when tracking has been lost, and displaying on the graphical user interface two overlapping transparent images of the environment. In addition to one or more of the features described herein above, or as an alternative, further embodiments of the system may include the two overlapping transparent images having a first transparent image and a second transparent image, the first transparent image being a current image of the environment acquired by the coordinate scanner, the second transparent image being an image from a position and a direction that the coordinate scanner has to be moved back to in order to recover tracking.

In addition to one or more of the features described herein above, or as an alternative, further embodiments of the method may include moving a coordinate scanner through an environment, the coordinate scanner being configured to optically measure three-dimensional coordinates; acquiring determine a plurality of three-dimensional coordinates to a plurality of locations on at least one surface in the environment with the coordinate scanner; displaying on a graphical user interface of a display a graphical quality indicator on the graphical user interface based at least in part on the quality attribute, the quality indicator is a graphical element having at least one movable element.

In addition to one or more of the features described herein above, or as an alternative, further embodiments of the method may include changing the size of the movable element is based on the quality attribute. In addition to one or more of the features described herein above, or as an alternative, further embodiments of the method may include the movable element having a first bar and a second bar, the first bar indicating a speed of the coordinate scanner, the second bar indicating an age of the targets.

In addition to one or more of the features described herein above, or as an alternative, further embodiments of the method may include displaying on the graphical user interface a quality symbol, wherein the at least one changeable element indicates a first quality attribute, the quality symbol indicates a second quality attribute. In addition to one or more of the features described herein above, or as an alternative, further embodiments of the method may include determining a speed of the coordinate scanner wherein the first quality attribute is based at least in part on the speed of the coordinate scanner, and the second quality attribute is based at least in part on a target attribute. In addition to one or more of the features described herein above, or as an alternative, further embodiments of the method may include the target attribute being the age of the target.

In addition to one or more of the features described herein above, or as an alternative, further embodiments of the method may include displaying a quality symbol on the graphical user interface and changing the quality symbol based on the quality attribute. In addition to one or more of the features described herein above, or as an alternative, further embodiments of the method may include the parameter being one of a length of the at least one movable element, a color of the at least one movable element, or a combination thereof.

In addition to one or more of the features described herein above, or as an alternative, further embodiments of the method may include: changing the graphical element to a first color when the process of measuring the plurality of three-dimensional coordinates with the coordinate scanner provides a density of the plurality of three-dimensional coordinates above a first threshold; changing the graphical element to a second color when the process of measuring the plurality of three-dimensional coordinates with the coordinate scanner provides the density of the plurality of three-dimensional coordinates below a second threshold; and changing the graphical element to a third color when the process of measuring the plurality of three-dimensional coordinates with the coordinate scanner provides the density of the plurality of three-dimensional coordinates being between the first threshold and the second threshold.

In addition to one or more of the features described herein above, or as an alternative, further embodiments of the method may include the first threshold and second threshold being based at least in part on the translational or rotational speed of movement of the coordinate scanner or an acquisition rate of the plurality of three-dimensional coordinates. In addition to one or more of the features described herein above, or as an alternative, further embodiments of the method may include the quality attribute being based at least in part on a translational speed of the coordinate scanner through the environment.

In addition to one or more of the features described herein above, or as an alternative, further embodiments of the method may include the quality attribute being based at least in part on at least one of: a number of tracking targets; an age of the targets; a rotational speed of the coordinate scanner; a quality threshold of images used to track the coordinate scanner; a number of three-dimensional points acquired; a 3D geometry of the environment; a distance to the objects being scanned; and a level of noise in the plurality of three-dimensional coordinates.

In addition to one or more of the features described herein above, or as an alternative, further embodiments of the method may include the graphical user interface having a first portion and a second portion, the quality indicator being positioned in the first portion. In addition to one or more of the features described herein above, or as an alternative, further embodiments of the method may include displaying an image of the three-dimensional coordinates in the second portion.

In addition to one or more of the features described herein above, or as an alternative, further embodiments of the method may include displaying a two-dimensional plan view of the environment in the second portion. In addition to one or more of the features described herein above, or as an alternative, further embodiments of the method may include determining a trajectory of the coordinate scanner and display the trajectory on the two-dimensional plan view.

In addition to one or more of the features described herein above, or as an alternative, further embodiments of the method may include instructing the operator via the quality indicator to perform a stationary scan. In addition to one or more of the features described herein above, or as an alternative, further embodiments of the method may include instructing the operator via the quality indicator to perform an anchor scan. In addition to one or more of the features described herein above, or as an alternative, further embodiments of the method may include instructing the operator via the quality indicator to record an anchor object.

In addition to one or more of the features described herein above, or as an alternative, further embodiments of the method may include determining when tracking has been lost, and displaying on the graphical user interface two overlapping transparent images of the environment. In addition to one or more of the features described herein above, or as an alternative, further embodiments of the method may include the two overlapping transparent images having a first transparent image and a second transparent image, the first transparent image being a current image of the environment acquired by the coordinate scanner, the second transparent image being an image from a position and a direction that the coordinate scanner has to be moved back to in order to recover tracking.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a three-dimensional (3D) scanning system with a graphical user interface (GUI) that provides feedback to the operator of the scanning quality of the scan being performed. In an embodiment, the GUI includes a graphical quality indicator that represents one or more parameters that indicate the quality of the data acquired by the scanner that provides advantages in reducing time to complete a scan and also avoid having the operator rescanning areas due to a data quality level that is less than desired. In one or more embodiments, the quality of the data is related to the movement of the 3D scanning system.

Figure 1:
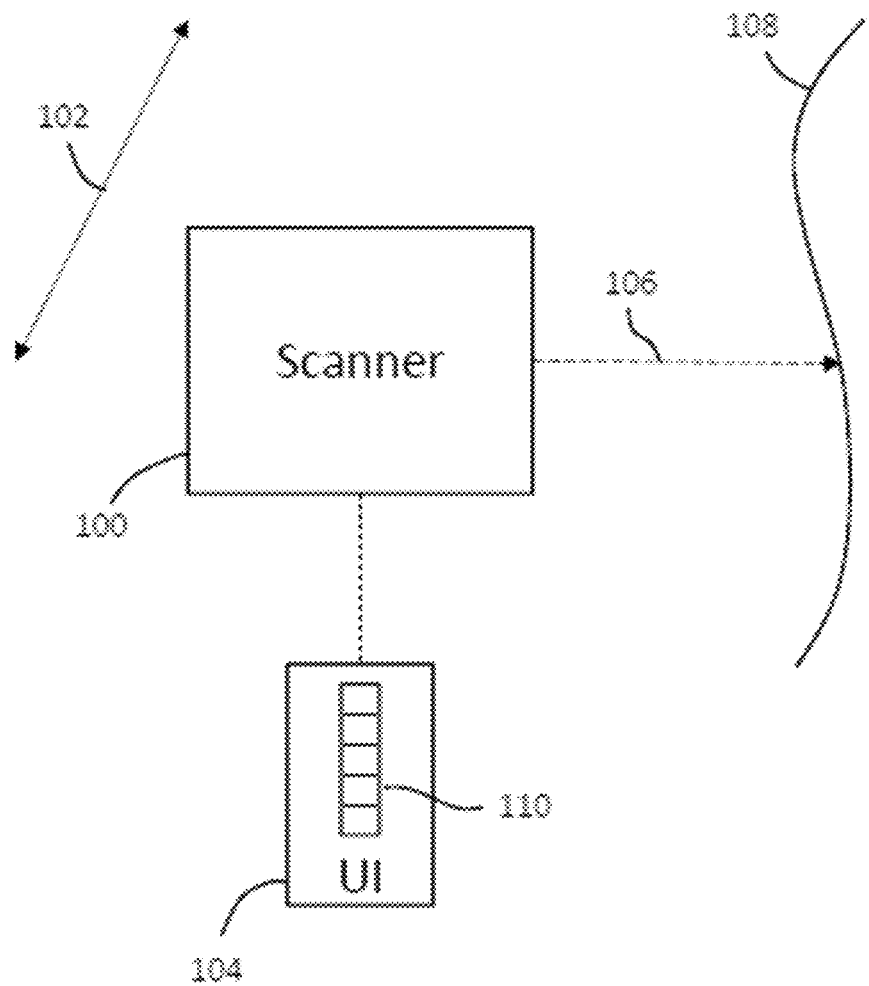
FIG. 1 is a schematic illustration of a 3D measurement device according to an embodiment of the disclosure.

Referring now to FIG. 1, an embodiment is shown of a 3D scanning system 100. The system 100 is movable as indicated by the arrow 102 and includes a GUI 104. The graphical user interface 104 may be integral with, separate from, or distally located relative to the system 100. In general, the system 100 uses an optical means to emit light 106 towards a surface 108 and receive light reflected therefrom. The system 100 uses the light 106 to determine the distance from the system 100 to the surface 108. When combined with positional information of the system 100, the three-dimensional coordinates of the surface 108 may be determined.

In an embodiment, the system 100 may be a handheld triangulation or structured light scanner, such as scanner 300 (FIG. 3) for example, or a mobile scanning platform 1200 (FIG. 12) for example, generally referred to herein as a coordinate scanner or a 3D measurement device. In an embodiment, the mobile scanning platform 1200 includes both a two-dimensional (2D) scanner and a 3D time-of-flight (TOF) type scanner. It should be appreciated that while certain optical scanning systems may be described in connection with the GUI 104, this is for exemplary purposes and the claims should not be so limited. It is contemplated that the GUI 104 may be used with any movable 3D scanning system where the motion of the system may impact the quality of the scanning data acquired.

In an embodiment, the system 100 is the same as is described in commonly owned U.S. patent application Ser. No. 16/806,548 entitled Three-Dimensional Measurement Device filed on Mar. 2, 2020, the contents of which is incorporated by reference in its entirety. In an embodiment, the system 100 is the same as is described in commonly owned United States Patent Publication 2020/0109943 entitled System and Method of Defining a Path and Scanning an Environment filed on Sep. 11, 2019, the contents of which is incorporated by reference in its entirety.

As discussed herein, the movement 102 of the system 100 through the environment may effect the quality of the scanning data. It should be appreciated that by moving too quickly, the system 100 will have a lower density of acquired 3D coordinates or points on the surface 108. Depending on the characteristics of the surface 108, at a given speed, the density of points may drop below a threshold. As a result, features on the surface 108 may not have a desired level of detail or resolution. Further, in some embodiments, the system 100 may determine the position and pose of the system 100 in 3D space based on the acquired measurements. This determination of position and pose, sometimes referred to as tracking, is based on the same features being measured multiple times as the system 100 is moved. When the system 100 is moved at or greater than a desired speed, the number of features used for tracking may be less than or equal to a threshold, resulting in the system 100 not determining its position or pose in the environment, sometimes referred to as losing tracking. In some embodiment, when the system 100 loses tracking, the acquired points may not be registered in a common coordinate frame of reference.

In an embodiment, the system 100 includes one or more processors that operate the system 100 and determine the plurality of three-dimensional coordinates of points on the surface acquired by the system 100 (e.g. the scan data). The one or more processors are further configured to determine a quality attribute for the scan data. The quality attribute may be determined on a periodic, aperiodic or continuous basis. The one or more processors are further configured to display a quality indicator 110 on the graphical user interface 104.

In an embodiment, the quality attribute may be based at least in part on the density of the plurality of three-dimensional coordinates. It should be appreciated that the density of the plurality of three-dimensional coordinates may be based on the speed the system 100 is moved, or on a point acquisition rate. In an embodiment, the quality attribute may be based on an attribute that includes, but is not limited to a number of tracking targets; an age of the targets; a rotational speed of the coordinate scanner; a quality threshold of images used to track the coordinate scanner; a number of three-dimensional points acquired; a 3D geometry of the environment; a distance to the objects being scanned; and a level of noise in the plurality of three-dimensional coordinates. As used herein, an age of a target is a number of times that a target appears in successive images by the system 100. It should be appreciated that if a target appears in a large number of successive images, the target is of higher reliability/quality for purposes of tracking. In an embodiment, it is desirable to have the target appear or be present in greater than 10 successive images. The targets may be natural features (e.g. edges, corners of surfaces) or artificial markers (e.g. checkerboards, sphere's).

Figure 2A:
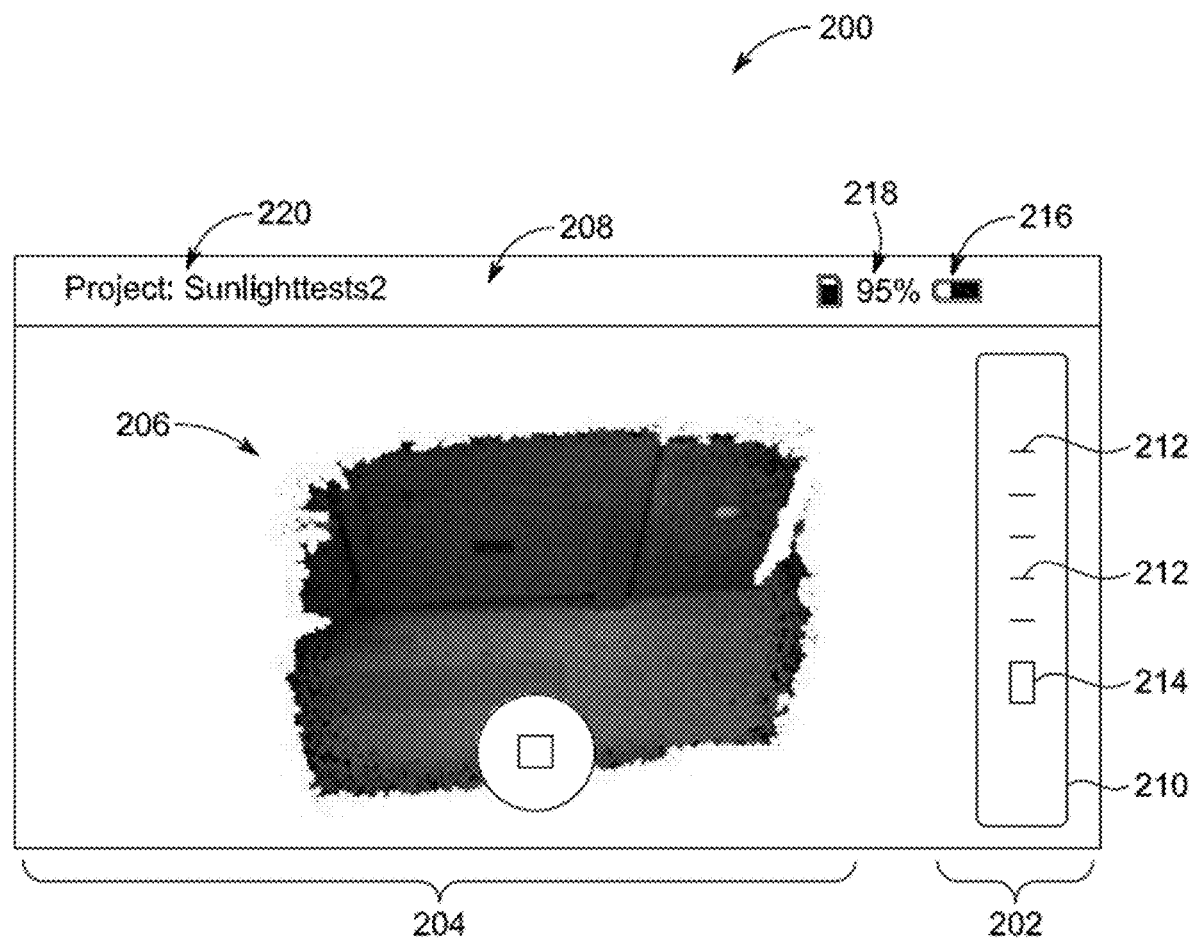
FIG. 2A is a graphical user interface for the 3D measurement device of FIG. 1 according to an embodiment of the disclosure.

Referring now to FIG. 2A, an embodiment of a graphical user interface 200 is shown that may be displayed on the graphical user interface for a mobile 3D measurement system, such as system 100 for example. In this embodiment, the GUI 200 includes a first portion 202 and a second portion 204. The first portion 202 may include a quality indicator 210, that may be the same as quality indicator 110. In an embodiment, the quality indicator 210 is shaped as an elongated bar or rectangle having a plurality of lines or gradations 212. The quality indicator 210 may further include a movable element 214. In an embodiment, the movable element 214 has a parameter, such as a length or size of the element for example, that changes. As will be discussed in more detail herein, the movable element 214 changes based at least in part on the value of the quality attribute.

Figure 2B:
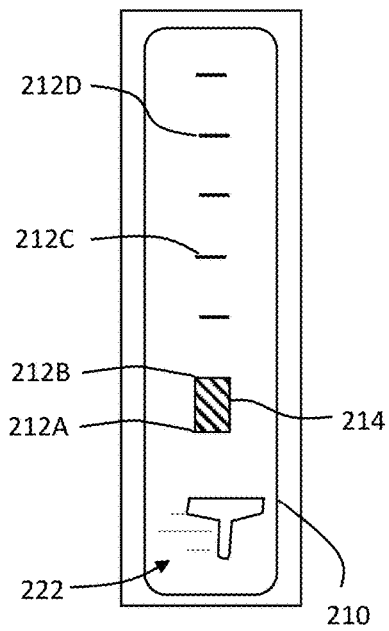
FIG. 2B, 2C and FIG. 2D are illustrations of a scan quality meter according to an embodiment.
Figure 2C:
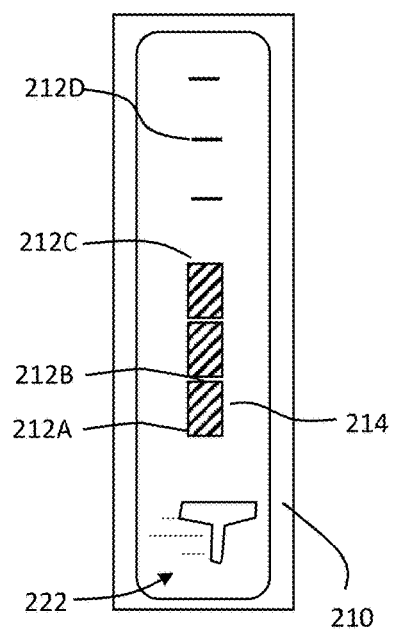
Figure 2D:
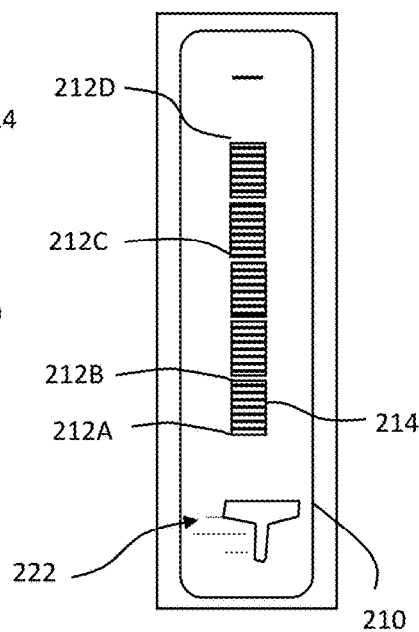

Referring now to FIG. 2B-2D, embodiments are shown of different sequences for the quality indicator 210. In FIG. 2B, the quality indictor 210 is displayed with the movable element 214 being a first size that is small compared to the length of the overall length of the indicator 210. In an embodiment, the movable element 214 may further have an associated first color, such as a green color for example when the movable element 214 is the first size. In an embodiment the first size corresponds to the movable indicator 214 being a rectangle that extends between first gradation 212A and second gradation 212B. In an embodiment, the movable element 214 is the first size or first color when the quality attribute is within a range of values (e.g. between thresholds) that provides a desirable quality of scan data.

Referring now to FIG. 2C, an embodiment is shown where the size of the movable element 214 has been changed to a second size, such as extending from gradation 212A to gradation 212C for example. In an embodiment, the movable element 214 changes color to a second color, such as yellow for example, when changed to the second size. In an embodiment, the movable element 214 is the second size or second color when the quality attribute is within a second range of values (e.g. between thresholds) that may provide a quality of scan data that is lower than desired.

Referring now to FIG. 2D, an embodiment is shown where the size of the movable element 214 has been changed to a third size, such as extending from gradation 212A to gradation 212D for example. In an embodiment, the movable element 214 changes color to a third color, such as red for example, when changed to the third size. In an embodiment, the movable element 214 is the third size or third color when the quality attribute is within a third range of values (e.g. between thresholds) that may provide a quality of scan data that is lower than desired. In an embodiment, the displaying of the movable element 214 as the third size or third color may indicate that the 3D measurement device 100 may have lost tracking (FIG. 2E) or the loss of tracking is imminent. In an embodiment, when the displaying of the movable element 214 as the third size or third color, an icon 222, such as a triangle with an exclamation point for example, may be displayed on GUI 200.

In an embodiment, the icon 222 may be used to indicate a different quality attribute from the moveable element 214. For example, the moveable element 214 size/color may be based at least in part on the translational speed of the system 100, while the icon 222 may be based on the quality of targets being scanned (e.g. the age of the targets) or on the image quality. In some embodiments, the icon 222 may change based on the quality attribute that is being indicated. In some embodiments, the quality attribute indicated by either the movable element 214 or the icon 222 may be user selected. In an embodiment, a representation of the scanning device is displayed (FIG. 2B), when the quality attributes are within a desired range.

It should be appreciated that while embodiments herein illustrate the first portion 202 as having a single movable element 214, this is for exemplary purposes and the claims should not be so limited. In other embodiments, the first portion may include multiple movable elements, with each movable element representing a different quality element (e.g. speed, point acquisition rate, age of targets, etc.). In still another embodiment, the GUI 200 may include a selector that allows the operator to change the quality attribute indicated by the movable element 214.

Referring to FIG. 2A, in an embodiment, the one or more processors are configured to display an image 206 of the scan data in the second portion 204. It should be appreciated that the displaying of the scan data while the system 100 is being operated provides advantages in allowing the operator to determine whether all of the surfaces or objects that were desired to be scanned have been acquired. It should further be appreciated that pairing the display of the scan data with the quality indicator provides still additional advantages in allowing the operator to determine what has been scanned and the quality of that data.

Figure 2E:
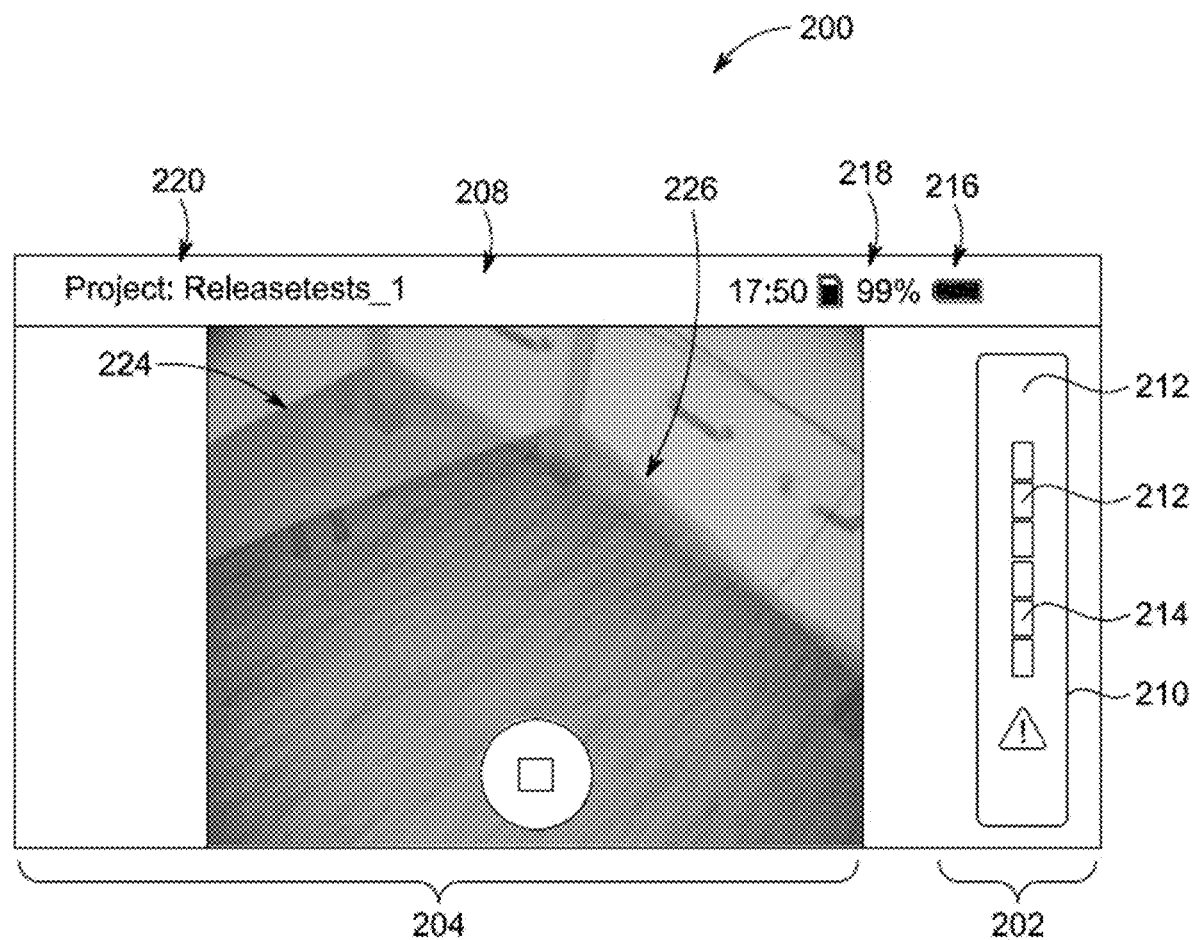
FIG. 2E is an illustration of the graphical user interface of FIG. 2A when the 3D measurement device loses tracking according to an embodiment of the disclosure.

As discussed, when tracking is lost, the GUI 200 may display the quality indicator 210 with the movable element 214 being the third length and third color (e.g. red) as is shown in FIG. 2E. In an embodiment, the display of the second portion 204 also changes to display two overlapping images. A first image 224 represents a current image of the environment and a second image 226 is positioned in a manner to indicate to the operator how to move the system 100 to re-acquire tracking. In other words, if the operator changes the position and/or pose of the system 100 to cause the second image 226 to overlap the first image 224, the system 100 may be able to re-acquire tracking.

In some embodiments, the GUI 200 may have further additional portions, such as a third portion 208 that may include data useful to the operator, such as an indicator 216 the energy level, an indicator 218 of the amount of storage space in memory, and a project name 220.

Figure 2F:
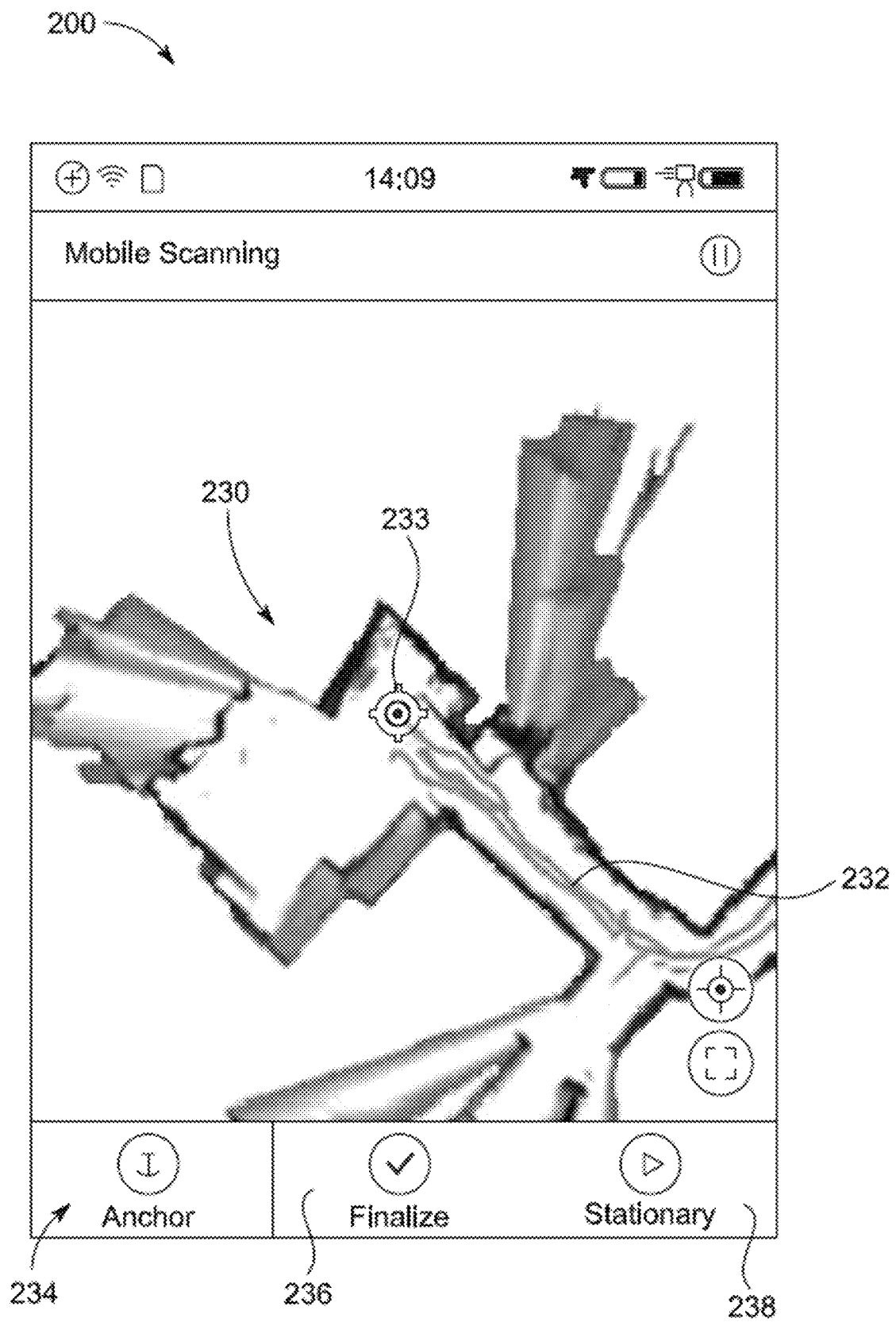
FIG. 2F is a graphical user interface for the 3D measurement device showing a 2D overview of the scan being performed according to an embodiment of the disclosure.

In some embodiments the GUI 200 may be configured to display a 2D plan view 230 of the scan data as is shown in FIG. 2F. In an embodiment, the plan view 230 may include a trajectory 232 or path that the system 100 followed in acquiring the scan data. In an embodiment, the plan view 230 may further include a symbol 233 or icon indicating where different types of scans were performed along the trajectory 232.

As described in more detail herein, in some embodiments the system 100 may be configured to perform different types of scans. These scans may be manually initiated by the operator, or the user may be prompted by the one or more processors. In an embodiment, the operator may be prompted to change the type of scan in response to the quality attribute being in the second range of values (e.g. the quality indicator is the second size or second color). To allow the operator to initiate a different type of scan, one or more icons 234, 236, 238 or selectors may be arranged on the GUI 200. For example purposes, the GUI 200 is illustrated with an anchor scan icon 234, a stationary scan icon 238 and a finalize scan icon 236.

Figure 2G:
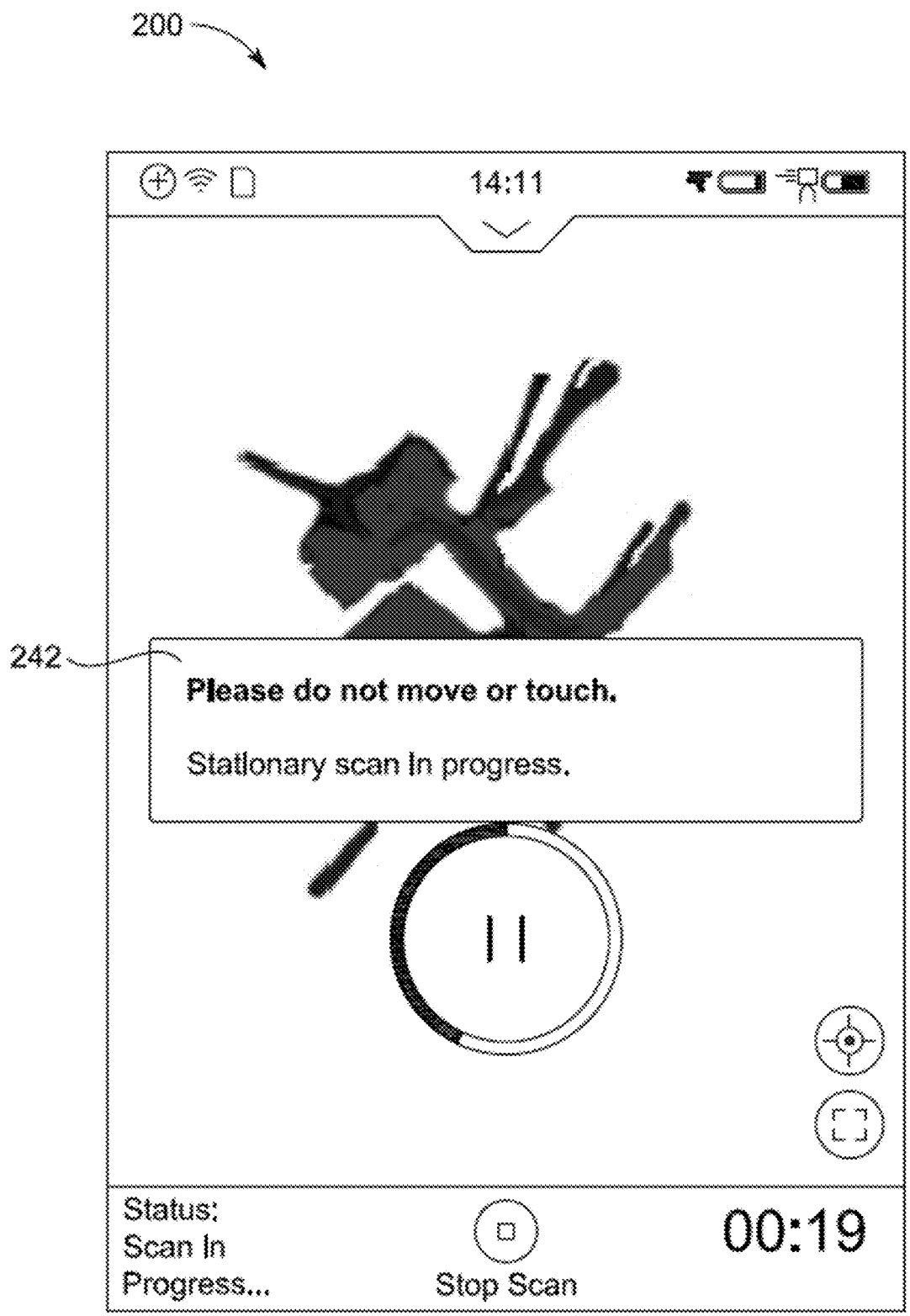
FIG. 2G is the graphical user interface of FIG. 2F when a stationary scan is being performed by the 3D measurement device according to an embodiment of the disclosure.
Figure 2H:
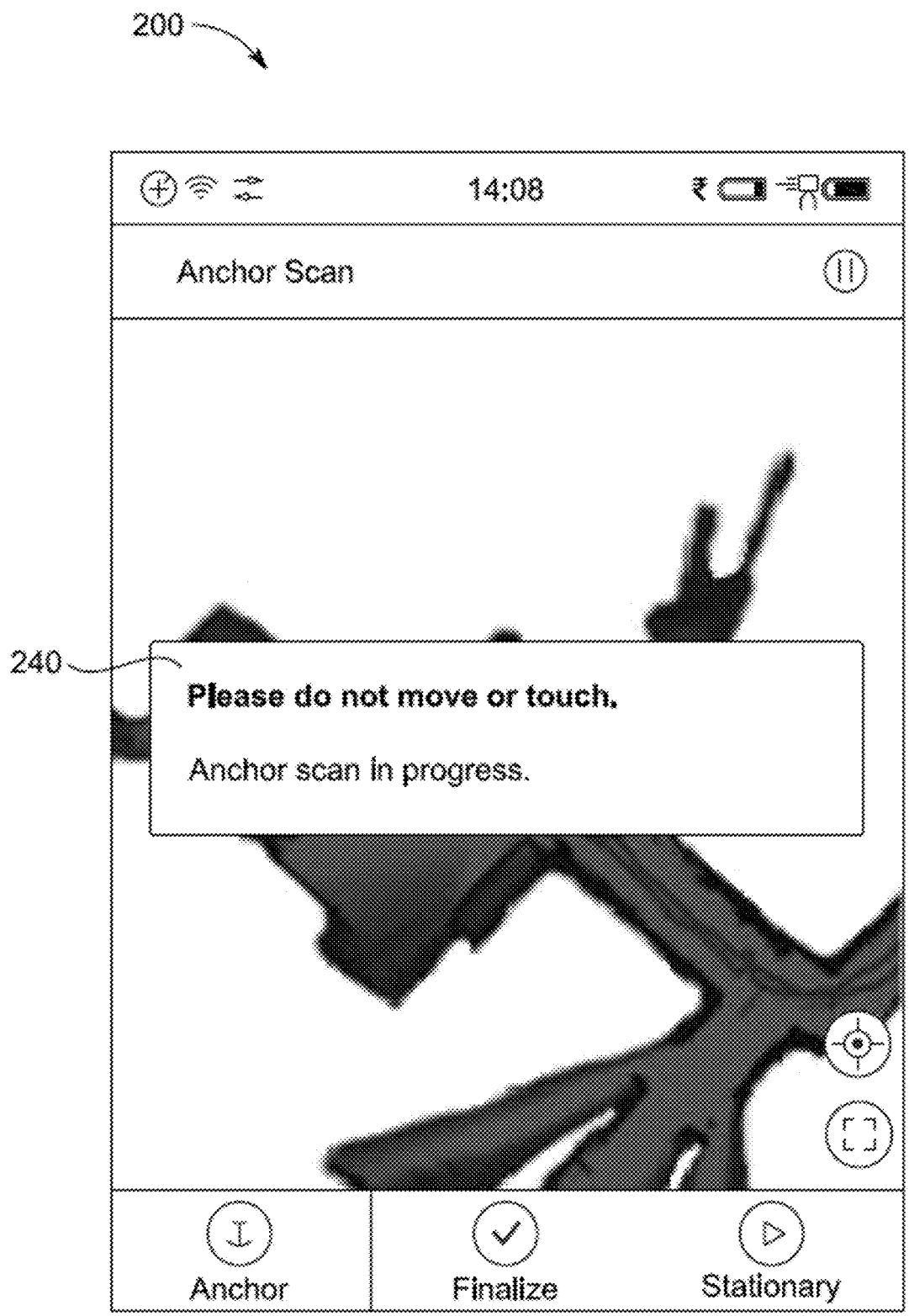
FIG. 2H is the graphical user interface of FIG. 2F when an anchor scan is being performed by the 3D measurement device according to an embodiment of the disclosure.

An anchor scan is a scan that is performed rapidly (e.g. volume is scanned within 5 seconds) while the system 100 is substantially stationary. In an embodiment, the anchor scan data is fully integrated with the scan data from when the system 100 is moving. In embodiments, the anchor scan is used to stabilize the bundling algorithm during post processing. In an embodiment, the GUI 200 may display a warning message 240 (FIG. 2H) when the anchor scan is being performed.

In still other embodiments, an the operator may be prompted (not shown) by the GUI 200 to record an anchor object. As used herein, an anchor object is an object in the recorded environment that is used for better alignment of the point cloud. An anchor object can be for example one or more natural features (e.g. a corner of a room) or an artificial target such as a marker with a unique ID.

A stationary scan is initiated by selecting the icon 238. The stationary scan is a scan that is performed at a higher resolution than is performed when the system 100 is being moved or during an anchor scan. In some embodiments, a stationary scan scans the volume in about a minute. In embodiments, scan data from a stationary scan is stored in memory separate from the mobile scan data while the system 100 is moving. This separately sequenced or stored scan data is registered with the mobile scan data during post processing. In some embodiments, parameters of the system 100 may be adjusted prior to the stationary scan. In still further embodiments, the stationary scan may acquire color data in addition to 3D coordinate data. In an embodiment, the GUI 200 may display a warning message 242 (FIG. 2G) when the stationary scan is being performed.

Figure 2I:
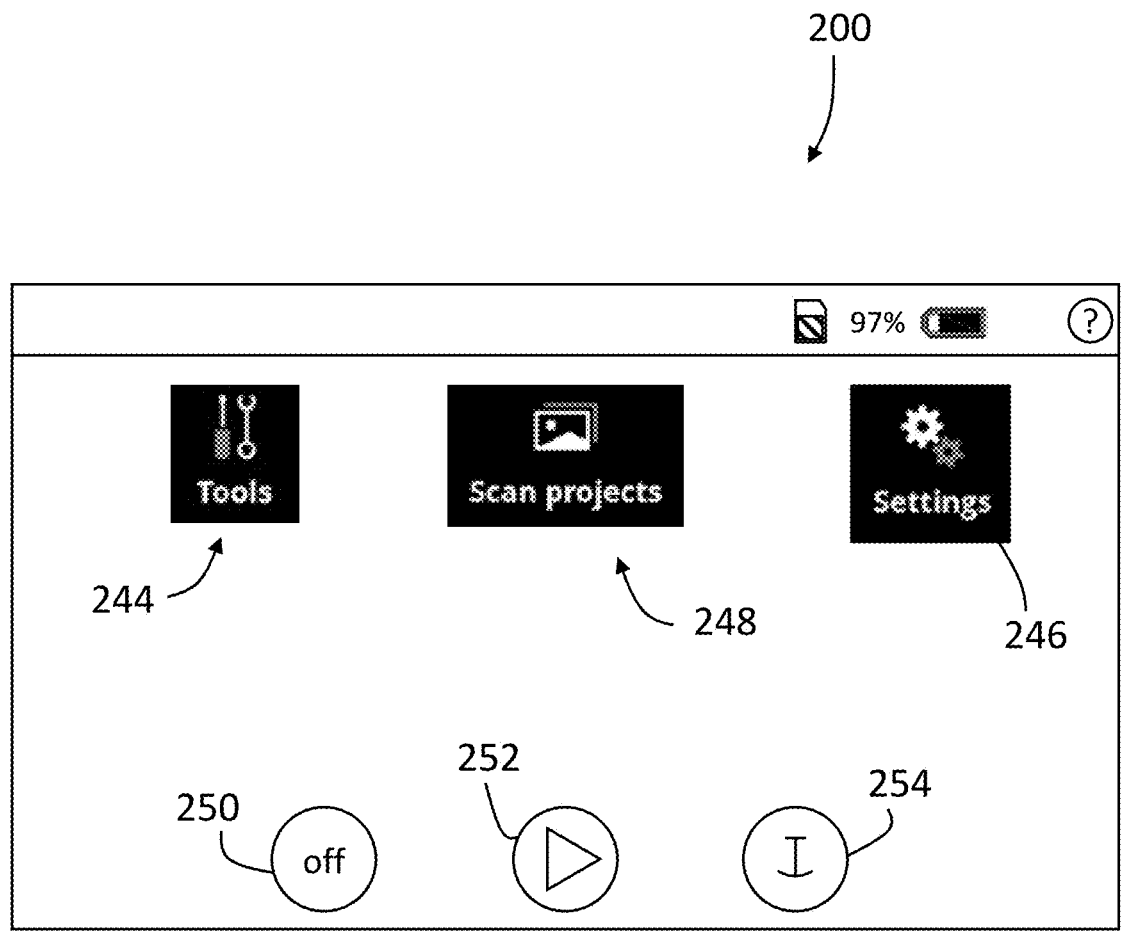
FIG. 2I is a graphical user interface for the 3D measurement device of FIG. 1 which allows for assignment of physical buttons on the 3D measurement device according to an embodiment of the disclosure.

In some embodiments, the GUI 200 may further have a display that provides options to the operator without displaying the second portion 204. This display may also be the startup or initial display. Referring to FIG. 2I, the options may include a tools element 244 for changing scanner parameters, a settings element 246 for changing parameters of the display, and a projects element 248 for allowing the operator to select how the scan data should be saved. The GUI 200 may further include operational icons 250, 252, 254 or selectors for controlling the operation of the system 100. These icons may include a light source on/off icon 250, a initiate/stop scan icon 252, and an anchor scan icon 254. In an embodiment, the icons or the functionality of the icons 250, 252, 254 may be user defined or user selected, such as through the settings icon 246 for example.

In an embodiment, the icons 250, 252, 254 correspond to physical buttons or actuators on the system 100. In an embodiment, when the functionality of the icons 250, 252, 254 is changed, the functionality of the physical buttons or actuators on the system 100 are changed to be the same as the icons on GUI 200. In an embodiment, the icons 250, 252, 254 are arranged in the same manner (e.g. position on the screen) as the physical buttons or actuators on the system 100.

Figure 3:
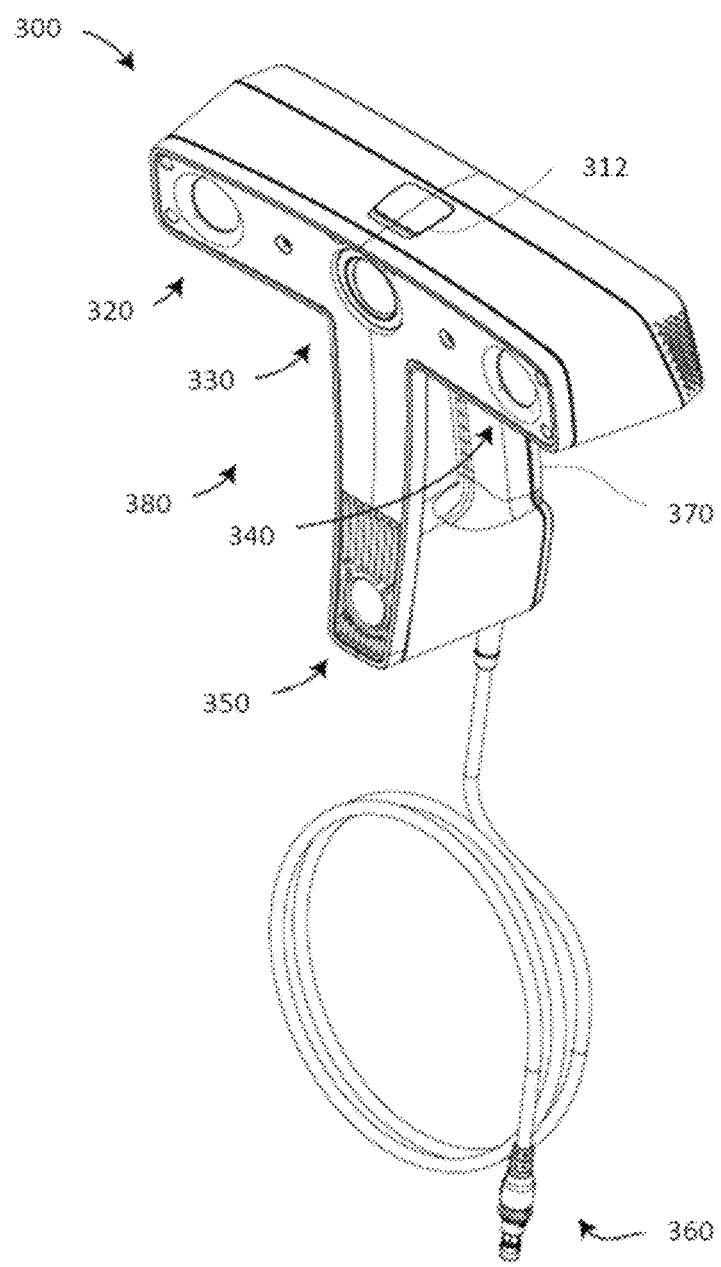
FIG. 3 is a front perspective view of a 3D triangulation scanner according to an embodiment of the disclosure.
Figure 4:
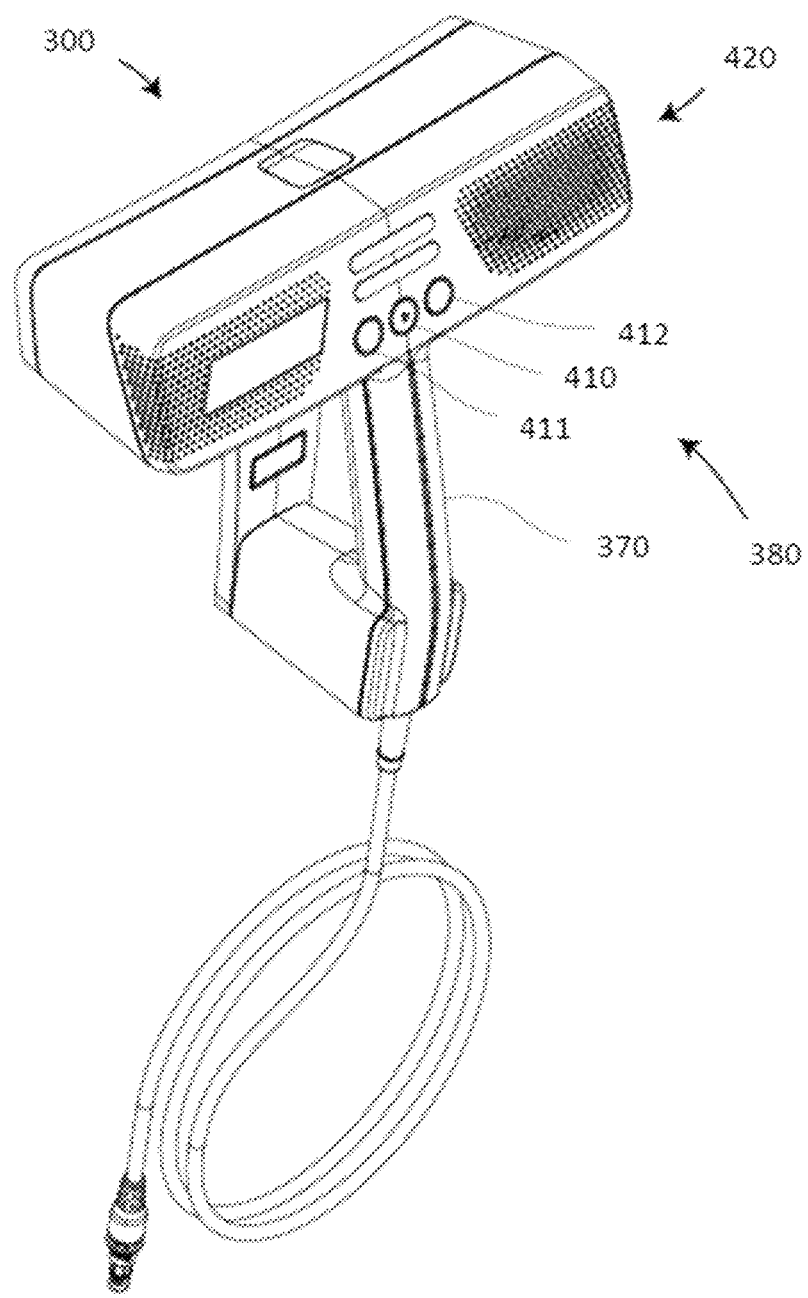
FIG. 4 is a rear perspective view of the 3D triangulation scanner according to an embodiment of the disclosure.

Referring now to FIGS. 3-11, an embodiment is shown of the system 100 where the 3D measurement device is a hand held triangulation scanner 300. FIG. 3 is a front isometric view of a handheld 3D measurement device 300, also referred to as a handheld 3D triangulation scanner or imager. In an embodiment, the device 300 includes a first infrared (IR) camera 320, a second IR camera 340, a registration camera 330, a projector 350, an Ethernet cable 360 and a handle 370. In an embodiment, the registration camera 330 is a color camera. Ethernet is a family of computer networking technologies standardized under IEEE 802.3. The enclosure 380 includes the outmost enclosing elements of the device 300, as explained in more detail herein below. FIG. 4 is a rear perspective view of the device 300 further showing an exemplary perforated rear cover 420 and a scan start/stop button 410. In an embodiment, buttons 411, 412 may be programmed to perform functions according to the instructions of a computer program, the computer program either stored internally within the device 300 or externally in an external computer. In an embodiment, each of the buttons 410, 411, 412 includes at its periphery a ring illuminated by a light emitting diode (LED). In an embodiment, the functionality of buttons 410, 411, 412 may be changed to match the icons 250, 252, 254 of FIG. 2I.

In an embodiment, the device 300 of FIG. 3 is the scanner described in commonly owned U.S. patent application Ser. No. 16/806,548 filed on Mar. 2, 2020, the contents of which are incorporated by reference herein in its entirety.

Figure 5A:
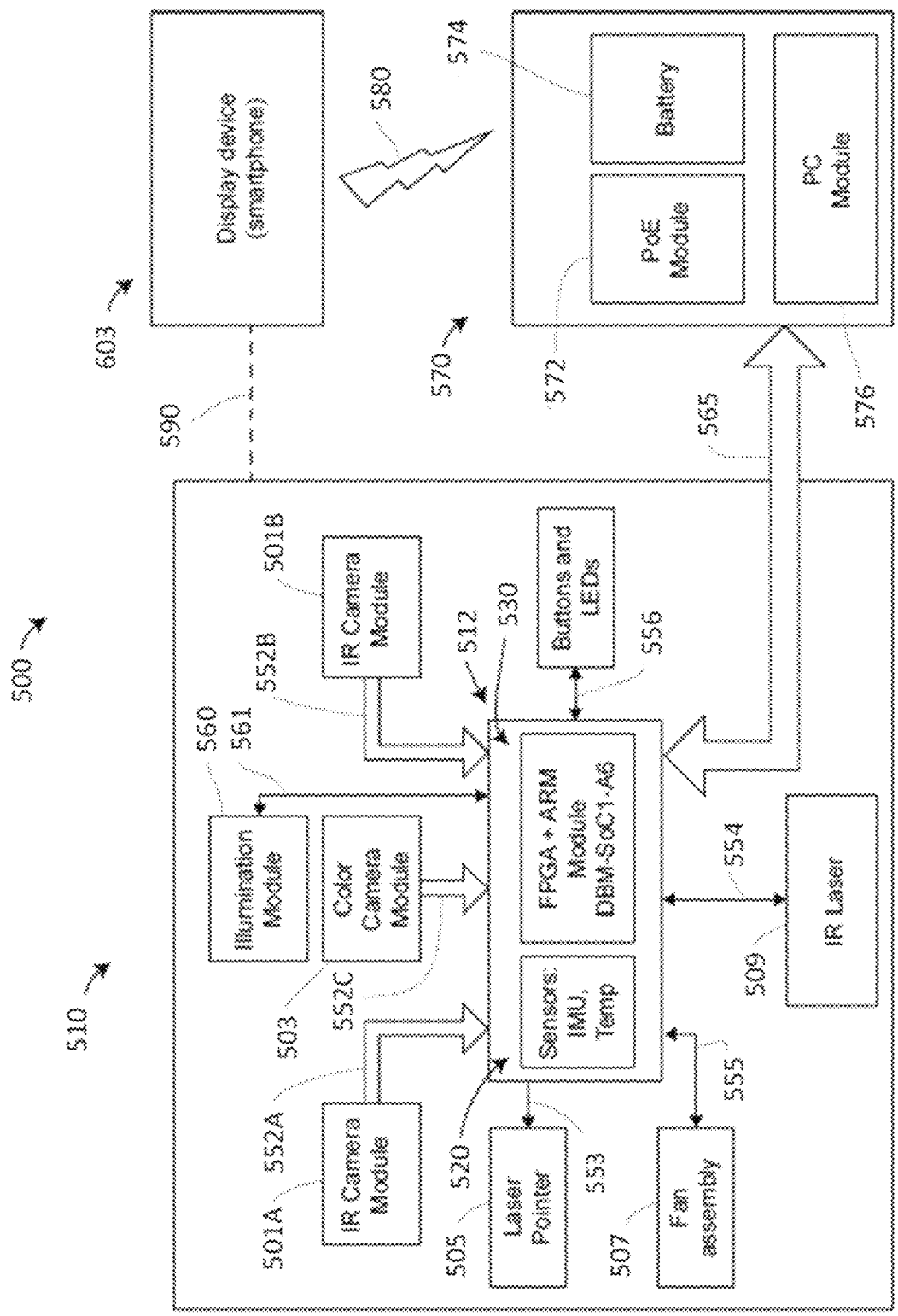
FIG. 5A and FIG. 5B are block diagrams of electronics coupled to the triangulation scanner according to an embodiment of the disclosure.
Figure 5B:
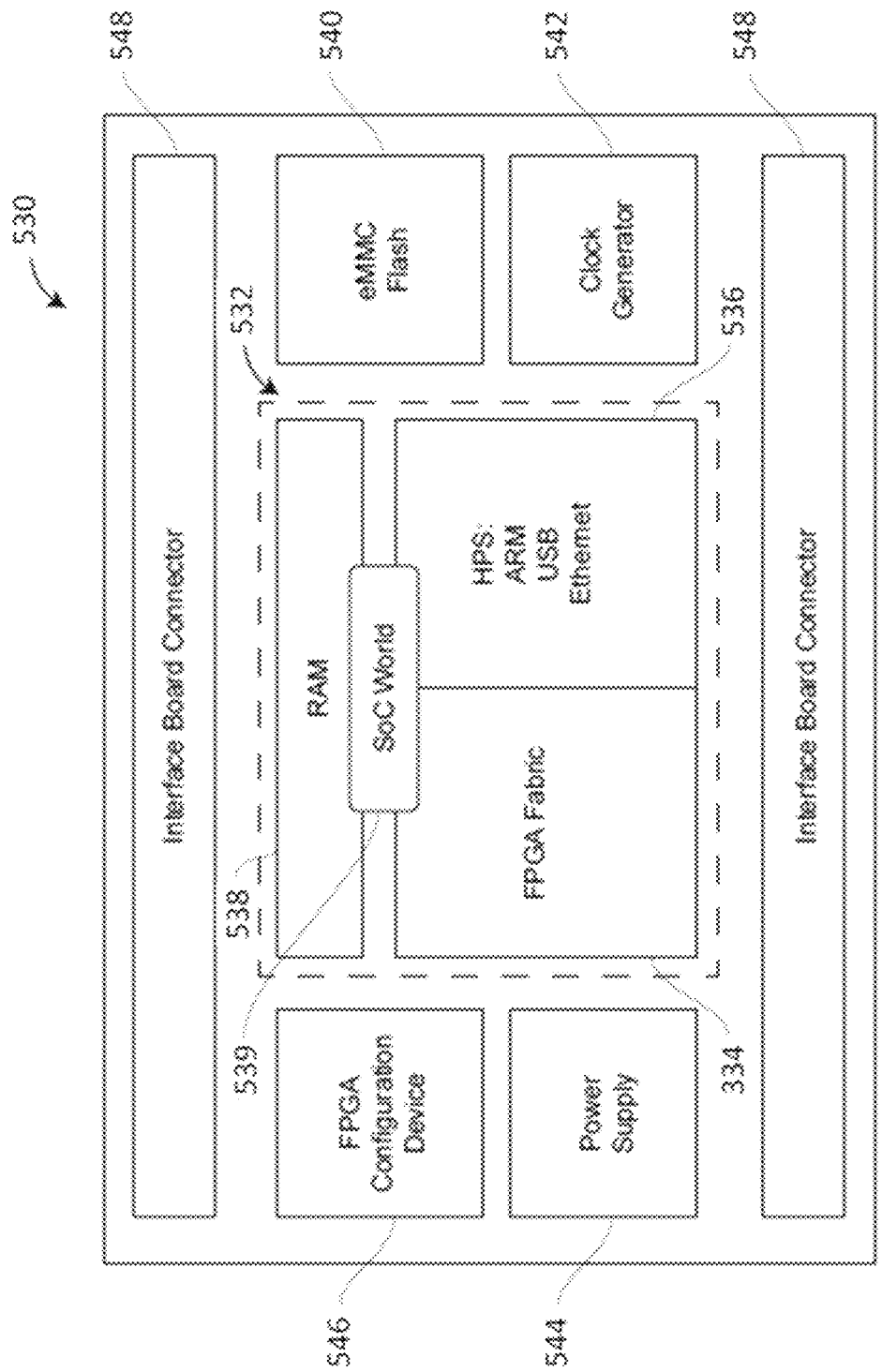

FIG. 5A is a block diagram of system electronics 500 that in an embodiment is included in the device 300. In an embodiment, the electronics 500 includes electronics 510 within the device 300, electronics 570 within the mobile PC 601 (FIG. 6), electronics within the mobile computing device 603, electronics within other electronic devices such as accessories that attach to an accessory interface (not shown), and electronics such as external computers that cooperate with the scanner system electronics 500. In an embodiment, the electronics 510 includes a circuit baseboard 512 that includes a sensor collection 520 and a computing module 530, which is further shown in FIG. 5B. In an embodiment, the sensor collection 520 includes an IMU and one or more temperature sensors. In an embodiment, the computing module 530 includes a system-on-a-chip (SoC) field programmable gate array (FPGA) 532. In an embodiment, the SoC FPGA 532 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, California. FIG. 5B represents the SoC FPGA 532 in block diagram form as including FPGA fabric 534, a Hard Processor System (HPS) 536, and random access memory (RAM) 538 tied together in the SoC 539. In an embodiment, the HPS 536 provides peripheral functions such as Gigabit Ethernet and USB. In an embodiment, the computing module 530 further includes an embedded MultiMedia Card (eMMC) 540 having flash memory, a clock generator 542, a power supply 544, an FPGA configuration device 546, and interface board connectors 548 for electrical communication with the rest of the system.

Signals from the infrared (IR) cameras 501A, 501B and the registration camera 503 are fed from camera boards through cables to the circuit baseboard 512. Image signals 552A, 552B, 552C from the cables are processed by the computing module 530. In an embodiment, the computing module 530 provides a signal 553 that initiates emission of light from the laser pointer 505. A TE control circuit communicates with the TE cooler within the infrared laser 509 through a bidirectional signal line 554. In an embodiment, the TE control circuit is included within the SoC FPGA 532. In another embodiment, the TE control circuit is a separate circuit on the baseboard 512. A control line 555 sends a signal to the fan assembly 507 to set the speed of the fans. In an embodiment, the controlled speed is based at least in part on the temperature as measured by temperature sensors within the sensor unit 520. In an embodiment, the baseboard 512 receives and sends signals to buttons 410, 411, 412 and their LEDs through the signal line 556. In an embodiment, the baseboard 512 sends over a line 561 a signal to an illumination module 560 that causes white light from the LEDs to be turned on or off.

In an embodiment, bidirectional communication between the electronics 510 and the electronics 570 is enabled by Ethernet communications link 565. In an embodiment, the Ethernet link is provided by the cable 360. In an embodiment, the cable 360 attaches to the mobile PC 601 through the connector on the bottom of the handle. The Ethernet communications link 565 is further operable to provide or transfer power to the electronics 510 through the user of a custom Power over Ethernet (PoE) module 572 coupled to the battery 574. In an embodiment, the mobile PC 570 further includes a PC module 576, which in an embodiment is an Intel® Next Unit of Computing (NUC) processor. The NUC is manufactured by Intel Corporation, with headquarters in Santa Clara, California. In an embodiment, the mobile PC 570 is configured to be portable, such as by attaching to a belt and carried around the waist or shoulder of an operator.

Figure 6:
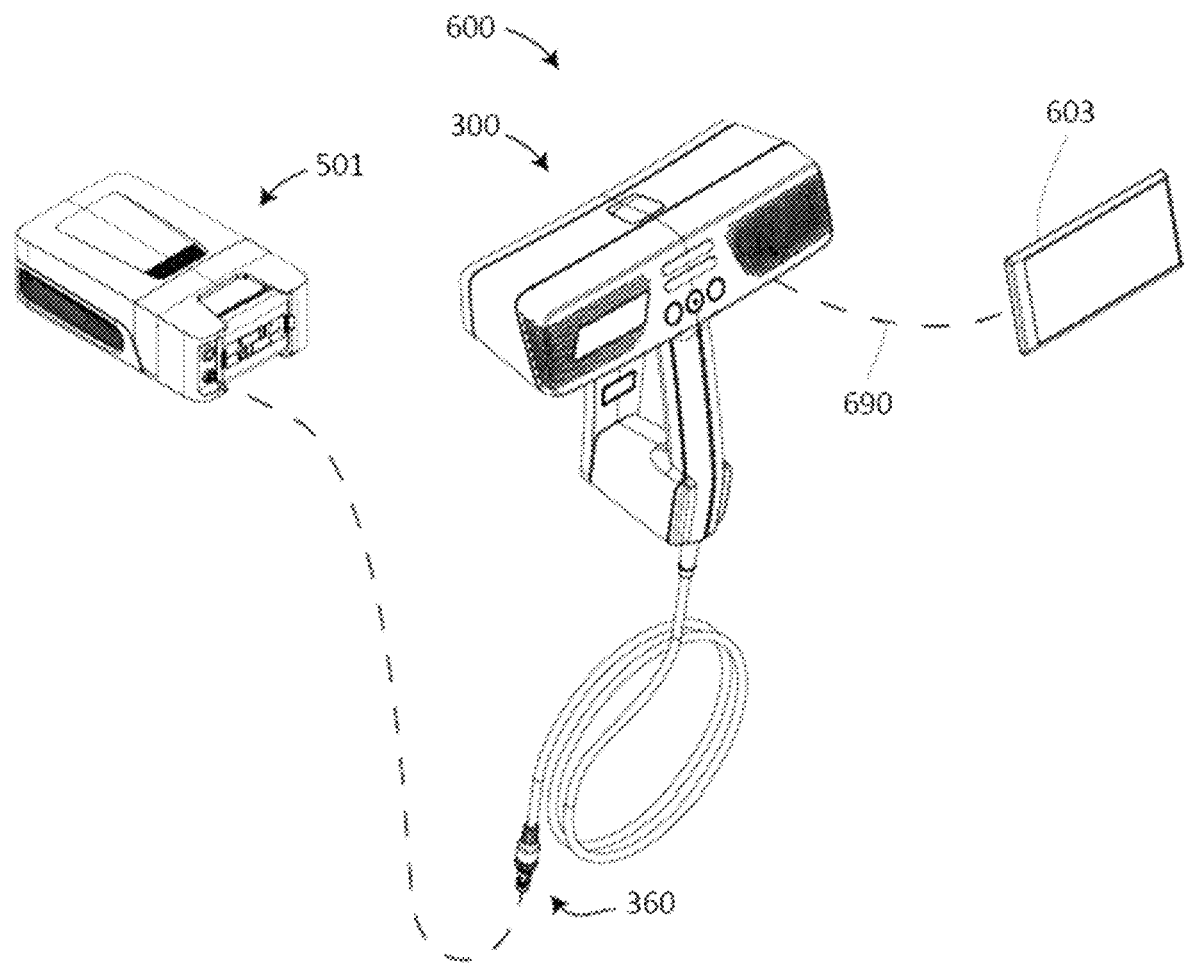
FIG. 6 illustrates a method of interconnecting a mobile PC with a mobile display using USB tethering according to an embodiment of the disclosure.

In an embodiment, shown in FIG. 6, the device 300 may be arranged in a first configuration 600. In this embodiment, a display 603, such as a mobile computing device or cellular phone may be configured to communicate with the device 300 or the mobile computing device or mobile PC 601. The communication between the display device 603 and the mobile PC 601 may be by cable or via a wireless medium (e.g. Bluetooth™ or WiFi). In an embodiment, a USB cable connects the mobile phone to the device 300, for example, through a USB cable 690 to a compatible USB port on the bottom of the main body of the scanner 10. In an embodiment, using USB tethering, the mobile display 603 is connected to the mobile PC 601 by the Ethernet cable 360 that provides Ethernet link 565.

Figure 7:
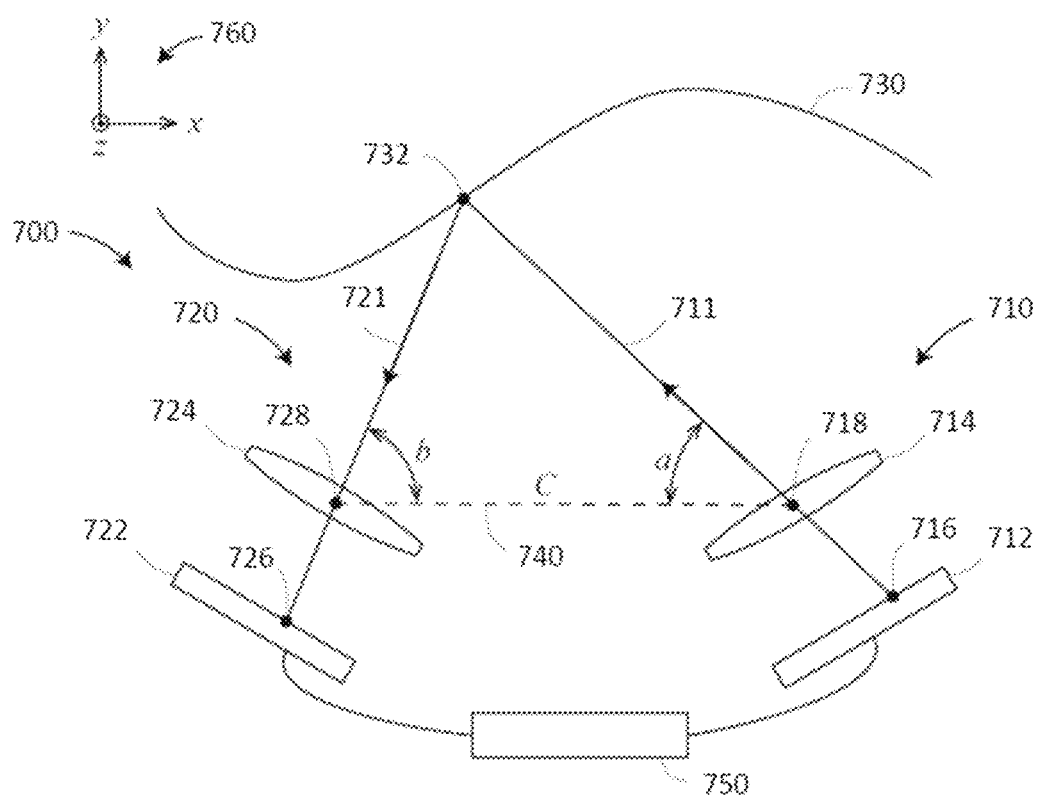
FIG. 7 is a schematic representation of a triangulation scanner having a projector and a camera according to an embodiment of the disclosure.

FIG. 7 shows a 3D measurement device (e.g. triangulation scanner or imager) 700 that projects a pattern of light over an area on a surface 730. The device 700, which has a frame of reference 760, includes a projector 710 and a camera 720. In an embodiment, the projector 710 includes an illuminated projector pattern generator 712, a projector lens 714, and a perspective center 718 through which a ray of light 711 emerges. The ray of light 711 emerges from a corrected point 716 having a corrected position on the pattern generator 712. In an embodiment, the point 716 has been corrected to account for aberrations of the projector, including aberrations of the lens 714, in order to cause the ray to pass through the perspective center 718, thereby simplifying triangulation calculations. In an embodiment, the pattern generator 712 includes a light source that sends a beam of light through a diffractive optical element (DOE). For example, the light source might be the infrared laser 509. A beam of light from the infrared laser 509 passes through the DOE, which diffracts the light into a diverging pattern such as a diverging grid of spots. In an embodiment, one of the projected rays of light 711 has an angle corresponding to the angle a in FIG. 7. In another embodiment, the pattern generator 712 includes a light source and a digital micromirror device (DMD). In other embodiments, other types of pattern generators 712 are used.

The ray of light 711 intersects the surface 730 in a point 732, which is reflected (scattered) off the surface and sent through the camera lens 724 to create a clear image of the pattern on the surface 730 of a photosensitive array 722. The light from the point 732 passes in a ray 721 through the camera perspective center 728 to form an image spot at the corrected point 726. The position of the image spot is mathematically adjusted to correct for aberrations of the camera lens. A correspondence is obtained between the point 726 on the photosensitive array 722 and the point 716 on the illuminated projector pattern generator 712. As explained herein below, the correspondence may be obtained by using a coded or an uncoded pattern of projected light. Once the correspondence is known, the angles a and b in FIG. 7 may be determined. The baseline 740, which is a line segment drawn between the perspective centers 718, 728, has a length C. Knowing the angles a, b and the length C, all the angles and side lengths of the triangle 728-732-718 may be determined. Digital image information is transmitted to a processor 750, which determines 3D coordinates of the surface 730. The processor 750 may also instruct the illuminated pattern generator 712 to generate an appropriate pattern.

Figure 8A:
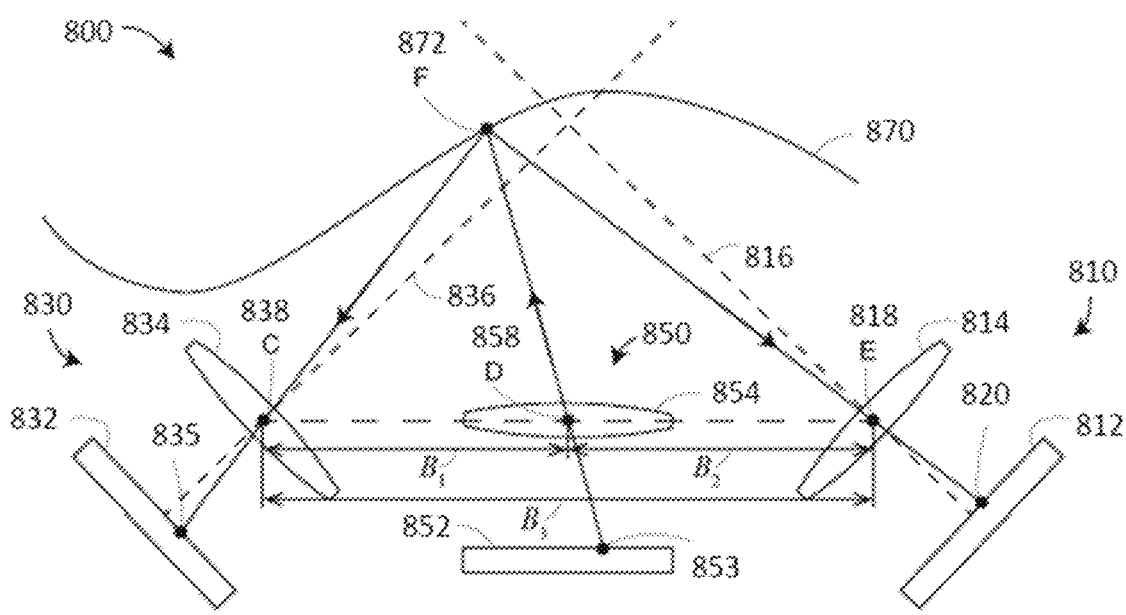
FIG. 8A is a schematic representation of a triangulation scanner having a projector and two cameras according to an embodiment of the disclosure.

FIG. 8A shows a structured light 3D measurement device (e.g. triangulation scanner) 800 having a projector 850, a first camera 810, and a second camera 830. The projector 850 creates a pattern of light on a pattern generator 852, which it projects from a corrected point 853 of the pattern through a perspective center 858 (point D) of the lens 854 onto an object surface 870 at a point 872 (point F). In an embodiment, the pattern generator is a DOE that projects a pattern based on principles of diffractive optics. In other embodiments, other types of pattern generators are used. The point 872 is imaged by the first camera 810 by receiving a ray of light from the point 872 through a perspective center 818 (point E) of a lens 814 onto the surface of a photosensitive array 812 of the camera as a corrected point 820. The point 820 is corrected in the read-out data by applying a correction factor to remove the effects of lens aberrations. The point 872 is likewise imaged by the second camera 830 by receiving a ray of light from the point 872 through a perspective center 838 (point C) of the lens 834 onto the surface of a photosensitive array 832 of the second camera as a corrected point 835. It should be understood that any reference to a lens in this document is understood to mean any possible combination of lens elements and apertures.

Figure 8B:
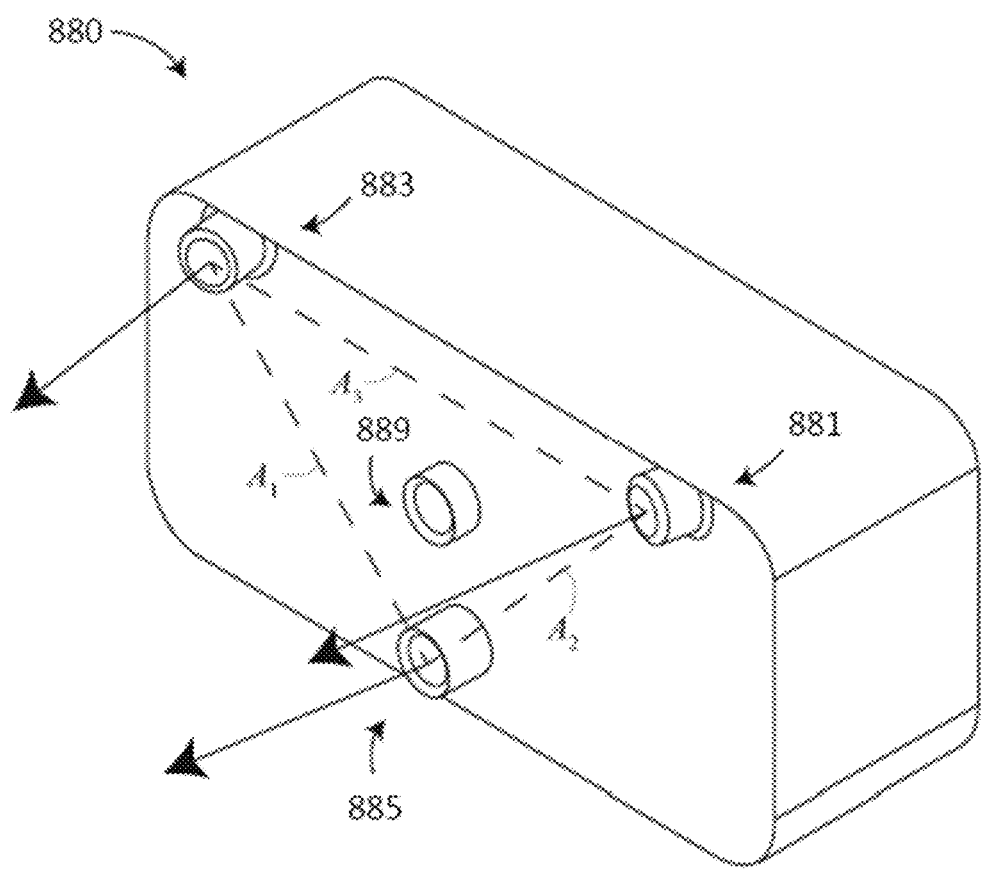
FIG. 8B is a perspective view of a triangulation scanner having a projector, two triangulation cameras, and a registration camera according to an embodiment of the disclosure.

FIG. 8B shows 3D measurement device (e.g. imager) 880 having two cameras 881, 883 and a projector 885 arranged in a triangle $A_1$-$A_2$-$A_3$. In an embodiment, the device 880 of FIG. 8B further includes a camera 889 that may be used to provide color (texture) information for incorporation into the 3D image. In addition, the camera 889 may be used to register multiple 3D images through the use of videogrammetry. This triangular arrangement provides additional information beyond that available for two cameras and a projector arranged in a straight line as illustrated in FIG. 8A. The additional information may be understood in reference to FIG. 8, which explains the concept of epipolar constraints, and FIG. 10, which explains how epipolar constraints are advantageously applied to the triangular arrangement of the device 880. In an embodiment, the elements 881, 883, 885, 889 in FIG. 8B correspond to the elements 340, 320, 350, 330 in FIG. 3.

Figure 9:
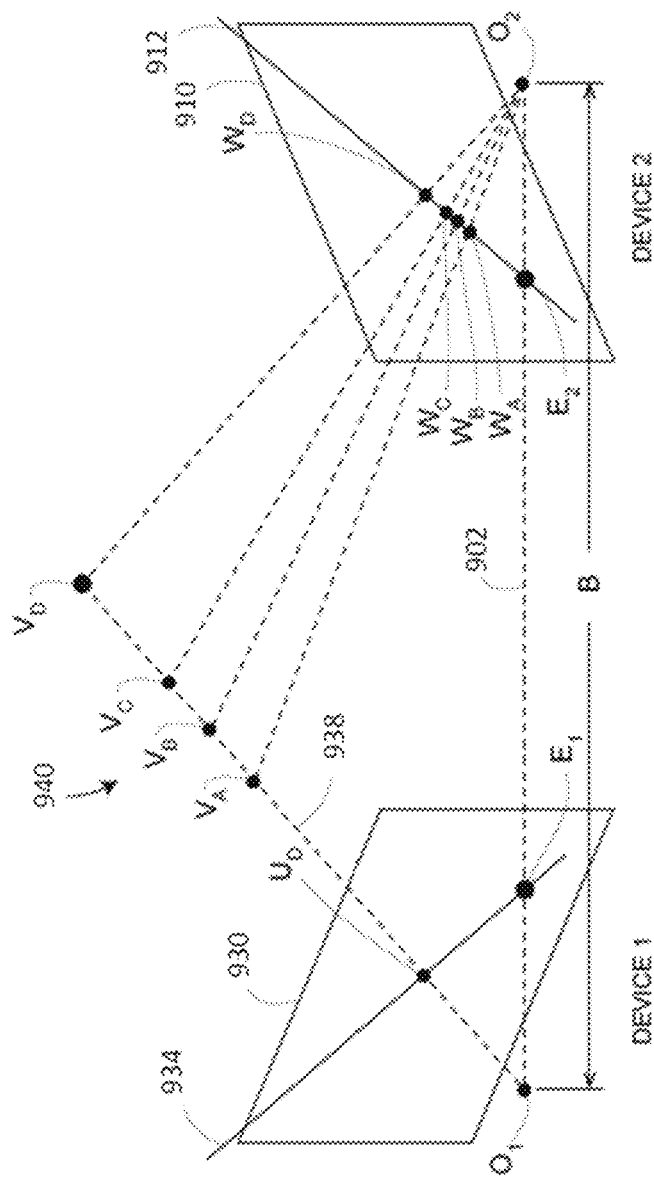
FIG. 9 is a schematic representation illustrating epipolar terminology.

In FIG. 9, a 3D measurement device (e.g. triangulation instrument) 940 includes a device 1 and a device 2 on the left and right sides, respectively. Device 1 and device 2 may be two cameras or device 1 and device 2 may be one camera and one projector. Each of the two devices, whether a camera or a projector, has a perspective center, $O_1$ and $O_2$, and a reference plane, 930 or 910. The perspective centers are separated by a baseline distance B, which is the length of the line 902 between $O_1$ and $O_2$. The perspective centers $O_1$, $O_2$ are points through which rays of light may be considered to travel, either to or from a point on an object. These rays of light either emerge from an illuminated projector pattern or impinge on a photosensitive array.

In FIG. 9, a device 1 has a perspective center $O_1$ and a reference plane 930, where the reference plane 930 is, for the purpose of discussion, equivalent to an image plane of the object point $O_1$ 930. In other words, the reference plane 930 is a projection of the image plane about the perspective center $O_1$. A device 2 has a perspective center $O_2$ and a reference plane 910. A line 902 drawn between the perspective centers $O_1$ and $O_2$ crosses the planes 930 and 910 at the epipole points $E_1$, $E_2$, respectively. Consider a point $U_D$ on the plane 930. If device 1 is a camera, an object point that produces the point $U_D$ on the reference plane 930 (which is equivalent to a corresponding point on the image) must lie on the line 938. The object point might be, for example, one of the points $V_A$, $V_B$, $V_C$, or $V_D$. These four object points correspond to the points $W_A$, $W_B$, $W_C$, $W_D$, respectively, on the reference plane 910 of device 2. This is true whether device 2 is a camera or a projector. It is also true that the four points lie on a straight line 912 in the plane 910. This line, which is the line of intersection of the reference plane 910 with the plane of $O_1$-$O_2$-$U_D$, is referred to as the epipolar line 912. It follows that any epipolar line on the reference plane 910 passes through the epipole $E_2$. Just as there is an epipolar line on the reference plane 910 of device 2 for any point $U_D$ on the reference plane of device 1, there is also an epipolar line 934 on the reference plane 930 of device 1 for any point on the reference plane 910 of device 2.

Figure 10:
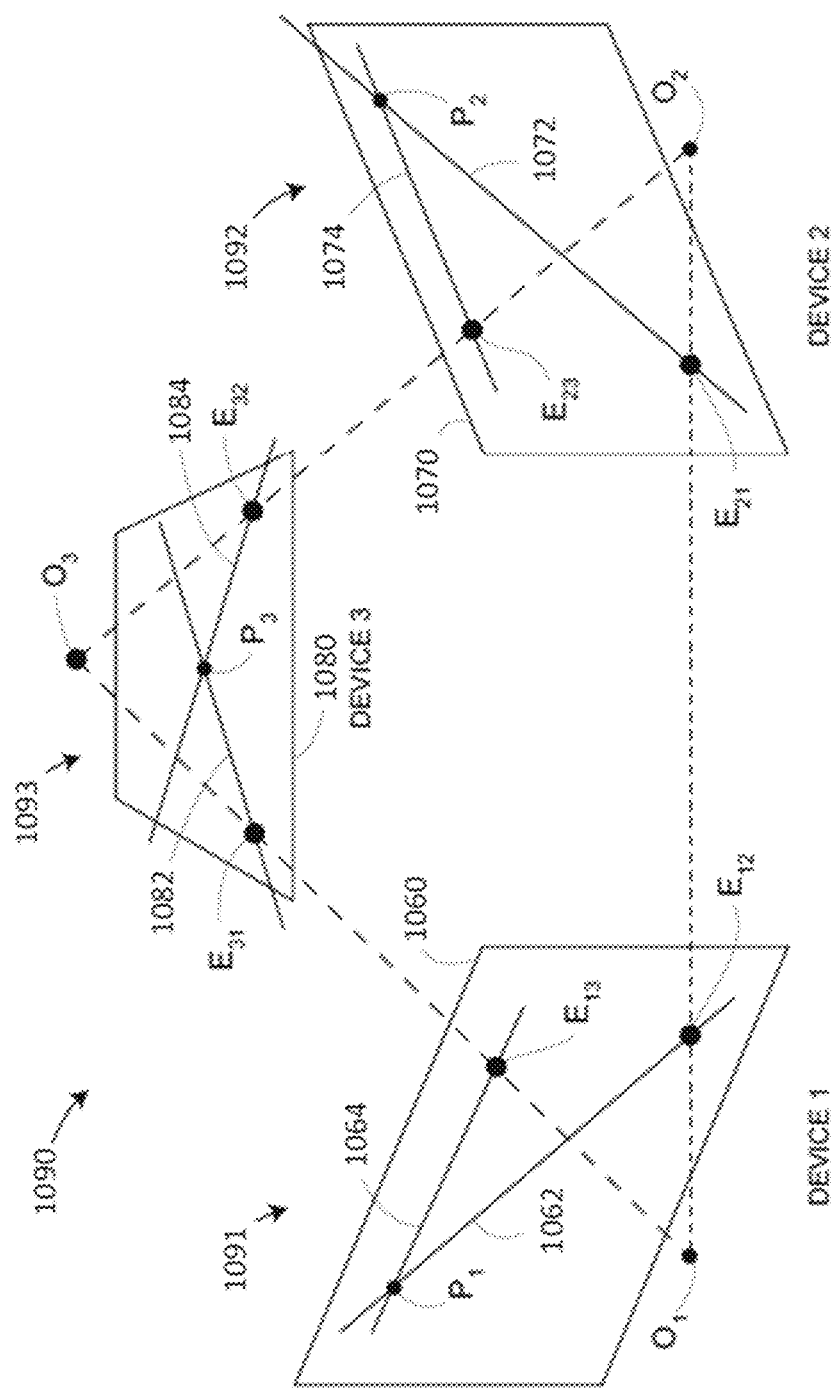
FIG. 10 is a schematic representation illustrating how epipolar relations may be advantageously used in when two cameras and a projector are placed in a triangular shape according to an embodiment of the disclosure.

FIG. 10 illustrates the epipolar relationships for a 3D measurement device (e.g. imager) 1090 corresponding to device 880 of FIG. 8B in which two cameras and one projector are arranged in a triangular pattern. In general, the device 1, device 2, and device 3 may be any combination of cameras and projectors as long as at least one of the devices is a camera. Each of the three devices 1091, 1092, 1093 has a perspective center $O_1$, $O_2$, $O_3$, respectively, and a reference plane 1060, 1070, and 1080, respectively. Each pair of devices has a pair of epipoles. Device 1 and device 2 have epipoles $E_{12}$, $E_{21}$ on the planes 1060, 1070, respectively. Device 1 and device 3 have epipoles $E_{13}$, $E_{31}$, respectively on the planes 1060, 1080, respectively. Device 2 and device 3 have epipoles $E_{23}$, $E_{32}$ on the planes 1070, 1080, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 10 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 1060 to obtain the epipolar line 1064. Intersect the plane $P_2$-$E_{21}$-$E_{12}$ to obtain the epipolar line 1062. If the image point $P_1$ has been determined consistently, the observed image point $P_1$ will lie on the intersection of the calculated epipolar lines 1062 and 1064.

To check the consistency of the image point $P_2$, intersect the plane $P_3$-$E_{32}$-$E_{23}$ with the reference plane 1070 to obtain the epipolar line 1074. Intersect the plane $P_1$-$E_{12}$-$E_{21}$ to obtain the epipolar line 1072. If the image point $P_2$ has been determined consistently, the observed image point $P_2$ will lie on the intersection of the calculated epipolar line 1072 and epipolar line 1074.

To check the consistency of the projection point $P_3$, intersect the plane $P_2$-$E_{23}$-$E_{32}$ with the reference plane 1080 to obtain the epipolar line 1084. Intersect the plane $P_1$-$E_{13}$-$E_{31}$ to obtain the epipolar line 1082. If the projection point $P_3$ has been determined consistently, the projection point $P_3$ will lie on the intersection of the calculated epipolar lines 1082, 1084.

The redundancy of information provided by using a 3D imager having three devices (such as two cameras and one projector) enables a correspondence among projected points to be established even without analyzing the details of the captured images and projected pattern features. Suppose, for example, that the three devices include two cameras and one projector. Then a correspondence among projected and imaged points may be directly determined based on the mathematical constraints of the epipolar geometry. This may be seen in FIG. 10 by noting that a known position of an illuminated point on one of the reference planes 1060, 1070, 1080 automatically provides the information needed to determine the location of that point on the other two reference planes. Furthermore, once a correspondence among points has been determined on each of the three reference planes 1060, 1070, 1080, a triangulation calculation may be performed using only two of the three devices of FIG. 10. A description of such a triangulation calculation is discussed in relation to FIG. 9.

Figure 11:
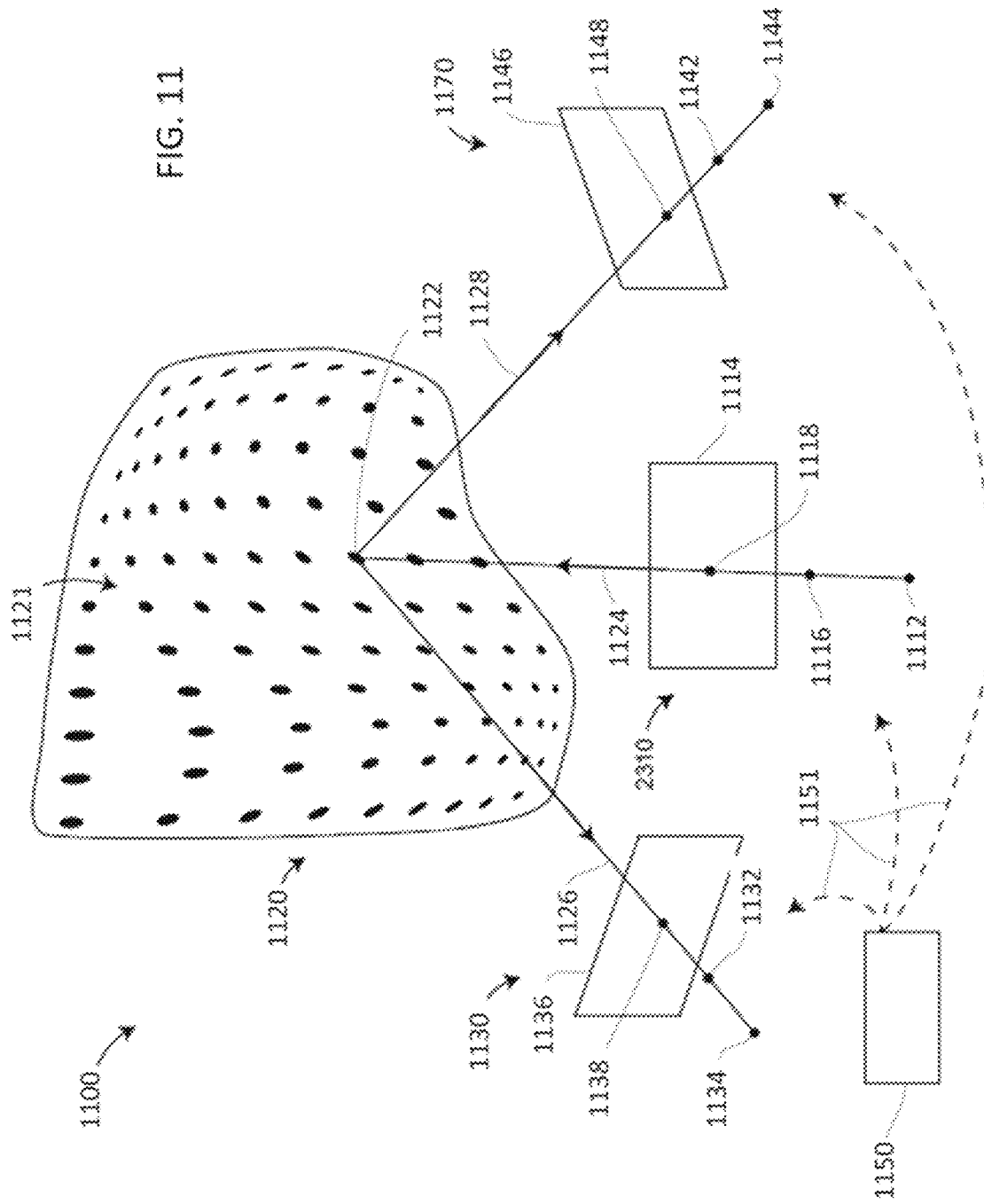
FIG. 11 illustrates a system in which 3D coordinates are determined for a grid of uncoded spots projected onto an object according to an embodiment of the disclosure.

By establishing correspondence based on epipolar constraints, it is possible to determine 3D coordinates of an object surface by projecting uncoded spots of light. An example of projection of uncoded spots is illustrated in FIG. 11. In an embodiment, a projector 1110 projects a collection of identical spots of light 1121 on an object 1120. In the example shown, the surface of the object 1120 is curved in an irregular manner causing an irregular spacing of the projected spots on the surface. One of the projected points is the point 1122, projected from a projector source element 1112 and passing through the perspective center 1116 as a ray of light 1124 forms a point 1118 on the reference plane 1114.

The point or spot of light 1122 on the object 1120 is projected as a ray of light 1126 through the perspective center 1132 of a first camera 1130, resulting in a point 1134 on the image sensor of the camera 1130. The corresponding point 1138 is located on the reference plane 1136. Likewise, the point or spot of light 1122 is projected as a ray of light 1128 through the perspective center 1142 of a second camera 1140, resulting in a point 1144 on the image sensor of the camera 1140. The corresponding point 1148 is located on the reference plane 1146. In an embodiment, a processor 1150 is in communication with the projector 1110, first camera 1130, and second camera 1140. The processor determines a correspondence among points on the projector 1110, first camera 1130, and second camera 1140. In an embodiment, the processor 1150 performs a triangulation calculation to determine the 3D coordinates of the point 1122 on the object 1120. An advantage of a scanner 1100 having three device elements, either two cameras and one projector or one camera and two projectors, is that correspondence may be determined among projected points without matching projected feature characteristics. In other words, correspondence can be established among spots on the reference planes 1136, 1114, and 1146 even without matching particular characteristics of the spots. The use of the three devices 1110, 1130, 1140 also has the advantage of enabling identifying or correcting errors in compensation parameters by noting or determining inconsistencies in results obtained from triangulation calculations, for example, between two cameras, between the first camera and the projector, and between the second camera and the projector.

Referring now to FIGS. 13-21, an embodiment is shown of system 100 having a mobile scanning platform 1200. The platform 1200 includes a frame 1202 having a tripod portion 1204 thereon. The frame 1202 further includes a plurality of wheels 1206 that allow the platform 1200 to be moved about an environment. The frame 1202 further includes a handle portion 1207 that provides a convenient place for the operator to push and maneuver the platform 1200.

The tripod portion 1204 includes a center post 1209. In an embodiment, the center post 1209 generally extends generally perpendicular to the surface that the platform 1200 is on. Coupled to the top of the post 1209 is a 3D measurement device 1210. In the exemplary embodiment, the 3D measurement device 1210 is a time-of-flight type scanner (either phase-based or pulse-based) that emits and receives a light to measure a volume about the scanner. In the exemplary embodiment, the 3D measurement device 1210 is the same as that described in reference to FIGS. 19A-19C herein.

Also attached to the center post 1209 is a 2D scanner 1308. In an embodiment, the 2D scanner 1308 is the same type of scanner as is described in reference to FIGS. 13-18 herein. In the exemplary embodiment, the 2D scanner emits light in a plane and measures a distance to an object, such as a wall for example. As described in more detail herein, these distance measurements may be used to generate a 2D map of an environment when the 2D scanner 1308 is moved therethrough. The 2D scanner 1308 is coupled to the center post by an arm that includes an opening to engage at least the handle portion of the 2D scanner 1308.

In an embodiment, one or both of the 3D scanner 1210 and the 2D scanner 1308 are removably coupled from the platform 1200. In an embodiment, the platform 1200 is configured to operate (e.g. operate the scanners 1308, 1210) while the platform 1200 is being carried by one or more operators.

In an embodiment, the mobile scanning platform 1200 may include a controller (not shown) that is coupled to communicate with both the 2D scanner 1308 and the 3D measurement device 1210.

Is should be appreciated that the platform 1200 is manually pushed by an operator through the environment. As will be discussed in more detail herein, as the platform 1200 is moved through the environment, both the 2D scanner 1308 and the 3D measurement device 1210 are operated simultaneously, with the data of the 2D measurement device being used, at least in part, to register the data of the 3D measurement system.

If should further be appreciated that in some embodiments, it may be desired to the measurement platform 1200 to be motorized in a semi-autonomous or fully-autonomous configuration. It should be appreciated that in an embodiment where the measurement platform 1200 is in a semi-autonomous or fully-autonomous configuration, the quality attribute may be a feedback signal to the one or more processors. In this embodiment, the one or more processors may automatically adjust the speed and/or direction of the Referring now to FIGS. 13-18, an embodiment of a 2D scanner 1308 is shown having a housing 1332 that includes a body portion 1334 and a removable handle portion 1336. It should be appreciated that while the embodiment of FIGS. 13-18 illustrate the 2D scanner 1308 with the handle 1336 attached, the handle 1336 may be removed before the 2D scanner 1308 is coupled to the platform 1200. In an embodiment, the handle 1336 may include an actuator that allows the operator to interact with the scanner 1308. In the exemplary embodiment, the body 1334 includes a generally rectangular center portion 1335 with a slot 1340 formed in an end 1342. The slot 1340 is at least partially defined by a pair walls 1344 that are angled towards a second end. A portion of a 2D laser scanner 1350 is arranged between the walls 1344. The walls 1344 are angled to allow the 2D laser scanner 1350 to operate by emitting a light over a large angular area without interference from the walls 1344. As will be discussed in more detail herein, the end 1342 may further include a three-dimensional camera or RGBD camera.

Figure 14:
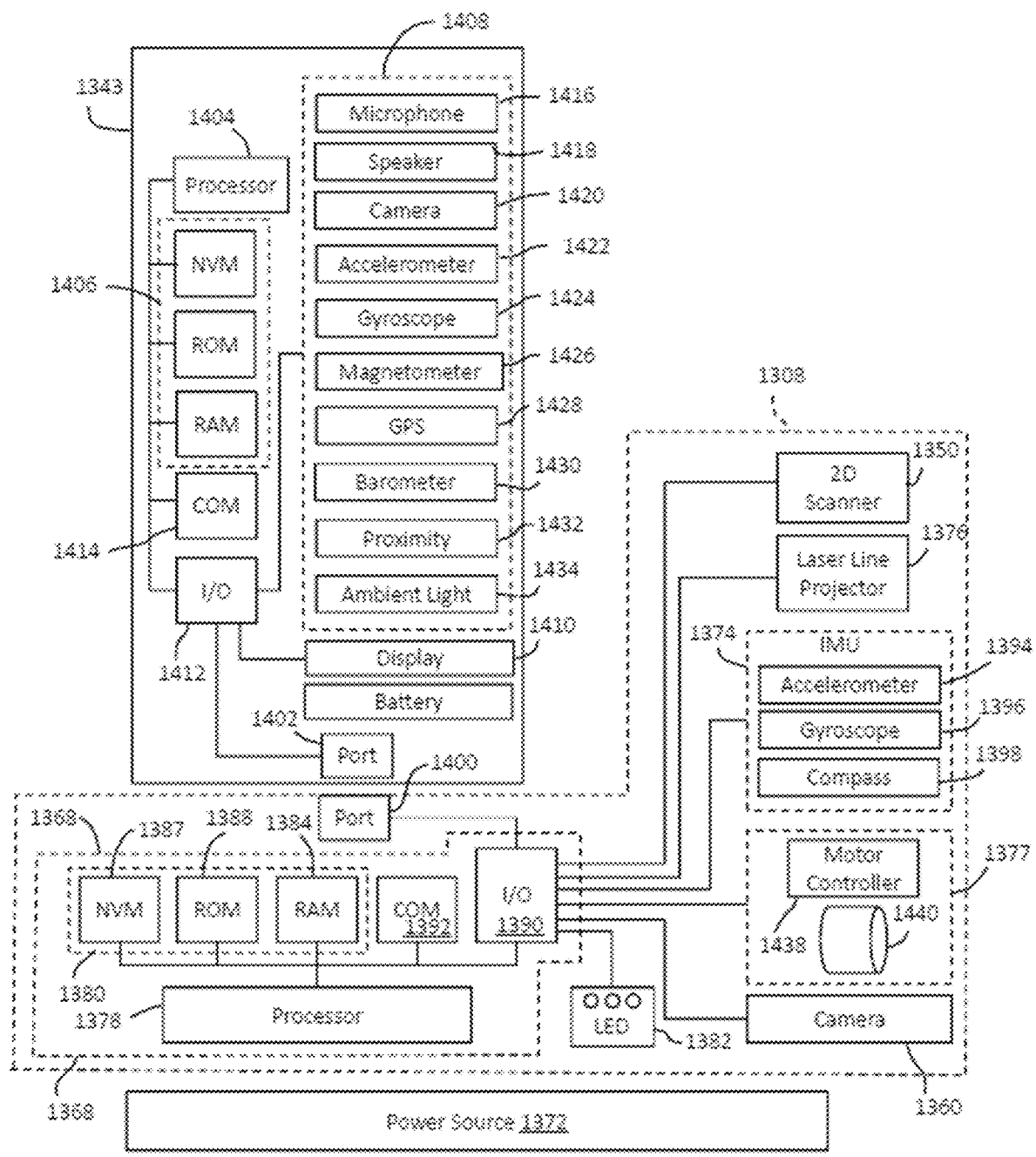
FIG. 14 is a block diagram of the system of FIG. 13.

Extending from the center portion 1335 is a mobile device holder 1341. The mobile device holder 1341 is configured to securely couple a mobile device 1343 to the housing 1332. The holder 1341 may include one or more fastening elements, such as a magnetic or mechanical latching element for example, that couples the mobile device 1343 to the housing 1332. In an embodiment, the mobile device 1343 is coupled to communicate with a controller 1368 (FIG. 14). The communication between the controller 1368 and the mobile device 1343 may be via any suitable communications medium, such as wired, wireless or optical communication mediums for example.

In the illustrated embodiment, the holder 1341 is pivotally coupled to the housing 1332, such that it may be selectively rotated into a closed position within a recess. In an embodiment, the recess is sized and shaped to receive the holder 1341 with the mobile device 1343 disposed therein. It should further be appreciated that when the 2D scanner 1308 is coupled to the mobile platform 1200 and a control system for the mobile platform 1200 (that may include one or more processors), then the operation of the 2D scanner 1308 may be controlled by the mobile platform controller.

In the exemplary embodiment, the second end 1348 includes a plurality of exhaust vent openings 1356. In an embodiment, the exhaust vent openings 1356 are fluidly coupled to intake vent openings arranged on a bottom surface of center portion 1335. The intake vent openings allow external air to enter a conduit having an opposite opening in fluid communication with the hollow interior of the body 1334. In an embodiment, the opening is arranged adjacent to the controller 1368 which has one or more processors that is operable to perform the methods described herein. In an embodiment, the external air flows from the opening over or around the controller 1368 and out the exhaust vent openings 1356.

The controller 1368 is electrically coupled to the 2D laser scanner 1350, the 3D camera 1360, a power source 1372, an inertial measurement unit (IMU) 1374, a laser line projector 1376, and a haptic feedback device 1377 (FIG. 14).

Figure 12:
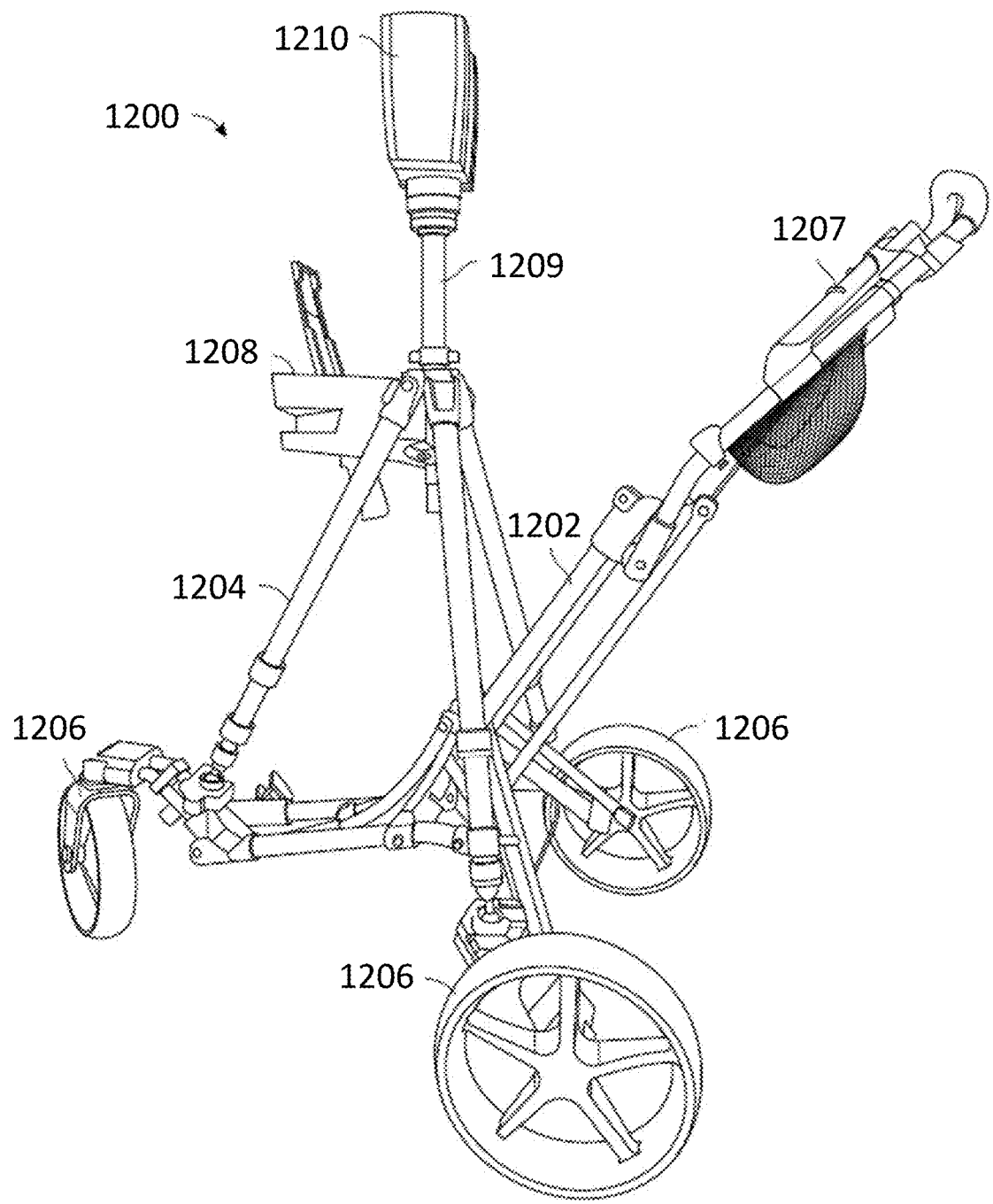
FIG. 12 is a perspective view of a mobile scanning platform according to an embodiment.
Figure 13:
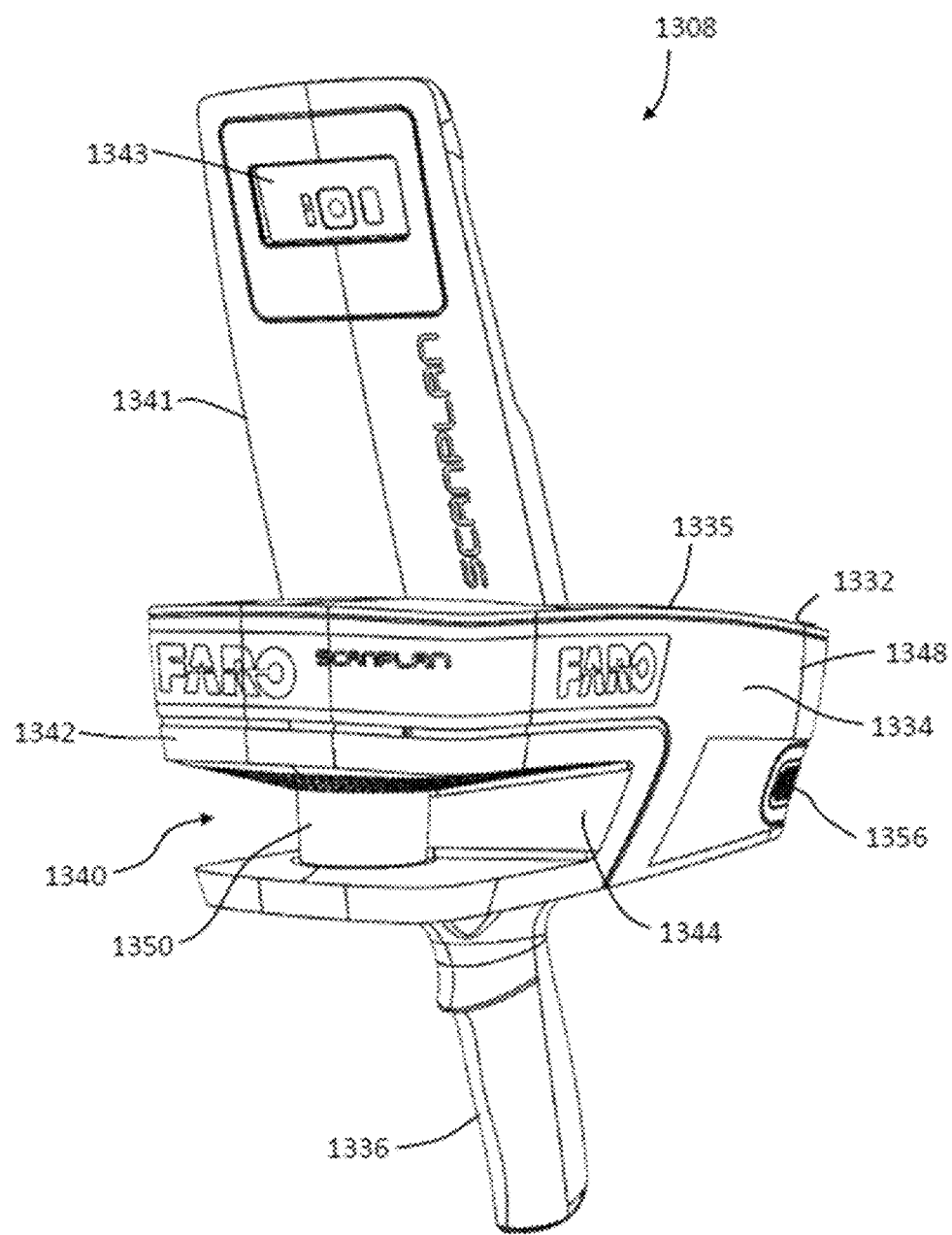
FIG. 13 is a perspective view of a two-dimensional (2D) scanning and mapping system for use with the mobile scanning platform of FIG. 12 in accordance with an embodiment.

Referring now to FIG. 14 with continuing reference to FIGS. 12-13, elements are shown of the scanner 1308 with the mobile device 1343 installed or coupled to the housing 1332. It should be appreciated that in some embodiments, the functionality of the mobile device 1343 may be replaced by the controller for the mobile platform 1200. Controller 1368 is a suitable electronic device capable of accepting data and instructions, executing the instructions to process the data, and presenting the results. The controller 1368 includes one or more processing elements 1378. The processors may be microprocessors, field programmable gate arrays (FPGAs), digital signal processors (DSPs), and generally any device capable of performing computing functions. The one or more processors 1378 have access to memory 1380 for storing information.

Controller 1368 is capable of converting the analog voltage or current level provided by 2D laser scanner 1350, camera 1360 and IMU 1374 into a digital signal to determine a distance from the scanner 1308 to an object in the environment. In an embodiment, the camera 1360 is a 3D or RGBD type camera. Controller 1368 uses the digital signals that act as input to various processes for controlling the scanner 1308. The digital signals represent one or more scanner 1308 data including but not limited to distance to an object, images of the environment, acceleration, pitch orientation, yaw orientation and roll orientation. As will be discussed in more detail, the digital signals may be from components internal to the housing 1332 or from sensors and devices located in the mobile device 1343.

In general, when the mobile device 1343 is not installed, controller 1368 accepts data from 2D laser scanner 1350 and IMU 1374 and is given certain instructions for the purpose of generating a two-dimensional map of a scanned environment. Controller 1368 provides operating signals to the 2D laser scanner 1350, the camera 1360, laser line projector 1376 and haptic feedback device 1377. Controller 1368 also accepts data from IMU 1374, indicating, for example, whether the operator is operating in the system in the desired orientation. In an embodiment, the controller 1368 compares the operational parameters to predetermined variances (e.g. yaw, pitch or roll thresholds) and if the predetermined variance is exceeded, generates a signal that activates the haptic feedback device 1377. The data received by the controller 1368 may be displayed on a user interface coupled to controller 1368. The user interface may be one or more LEDs (light-emitting diodes) 1382, an LCD (liquid-crystal diode) display, a CRT (cathode ray tube) display, or the like. A keypad may also be coupled to the user interface for providing data input to controller 1368. In one embodiment, the user interface is arranged or executed on the mobile device 1343.

The controller 1368 may also be coupled to external computer networks such as a local area network (LAN) and the Internet. A LAN interconnects one or more remote computers, which are configured to communicate with controllers 1368 using a well-known computer communications protocol such as TCP/IP (Transmission Control Protocol/Internet(ˆ) Protocol), RS-232, ModBus, and the like. additional scanners 1308 may also be connected to LAN with the controllers 1368 in each of these scanners 1308 being configured to send and receive data to and from remote computers and other scanners 1308. The LAN may be connected to the Internet. This connection allows controller 1368 to communicate with one or more remote computers connected to the Internet.

The processors 1378 are coupled to memory 1380. The memory 1380 may include random access memory (RAM) device 1384, a non-volatile memory (NVM) device 1386, a read-only memory (ROM) device 1388. In addition, the processors 1378 may be connected to one or more input/output (I/O) controllers 1390 and a communications circuit 1392. In an embodiment, the communications circuit 1392 provides an interface that allows wireless or wired communication with one or more external devices or networks, such as the LAN discussed above or the communications circuit 1318.

Controller 1368 includes operation control methods embodied in application code such as that shown or described with reference to FIGS. 15-18. These methods are embodied in computer instructions written to be executed by processors 1378, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 1368 is the 2D laser scanner 1350. The 2D laser scanner 1350 measures 2D coordinates in a plane. In the exemplary embodiment, the scanning is performed by steering light within a plane to illuminate object points in the environment. The 2D laser scanner 1350 collects the reflected (scattered) light from the object points to determine 2D coordinates of the object points in the 2D plane. In an embodiment, the 2D laser scanner 1350 scans a spot of light over an angle while at the same time measuring an angle value and corresponding distance value to each of the illuminated object points.

Examples of 2D laser scanners 1350 include, but are not limited to Model LMS100 scanners manufactured by Sick, Inc of Minneapolis, MN and scanner Models URG-04LX-UGO1 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D laser scanner 1350 is oriented so as to scan a beam of light over a range of angles in a generally horizontal plane (relative to the floor of the environment being scanned). At instants in time the 2D laser scanner 1350 returns an angle reading and a corresponding distance reading to provide 2D coordinates of object points in the horizontal plane. In completing one scan over the full range of angles, the 2D laser scanner returns a collection of paired angle and distance readings. As the platform 1200 is moved from place to place, the 2D laser scanner 1350 continues to return 2D coordinate values. These 2D coordinate values are used to locate the position of the scanner 1308 thereby enabling the generation of a two-dimensional map or floorplan of the environment.

Also coupled to the controller 1386 is the IMU 1374. The IMU 1374 is a position/orientation sensor that may include accelerometers 1394 (inclinometers), gyroscopes 1396, a magnetometers or compass 1398, and altimeters. In the exemplary embodiment, the IMU 1374 includes multiple accelerometers 1394 and gyroscopes 1396. The compass 1398 indicates a heading based on changes in magnetic field direction relative to the earth's magnetic north. The IMU 1374 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 1374 determines the pose or orientation of the scanner 1308 about three-axis to allow a determination of a yaw, roll and pitch parameter.

In an embodiment, the scanner 1308 further includes a camera 1360 that is a 3D or RGB-D camera. As used herein, the term 3D camera refers to a device that produces a two-dimensional image that includes distances to a point in the environment from the location of scanner 1308. The 3D camera 1360 may be a range camera or a stereo camera. In an embodiment, the 3D camera 1360 includes an RGB-D sensor that combines color information with a per-pixel depth information. In an embodiment, the 3D camera 1360 may include an infrared laser projector 1331 (FIG. 17), a first infrared camera 1333, a second infrared camera 1339, and a color camera 1337. In an embodiment, the 3D camera 460 is a RealSense™ camera model R200 manufactured by Intel Corporation.

In an embodiment, when the mobile device 1343 is coupled to the housing 1332, the mobile device 1343 becomes an integral part of the scanner 1308. In an embodiment, the mobile device 1343 is a cellular phone, a tablet computer or a personal digital assistant (PDA). The mobile device 1343 may be coupled for communication via a wired connection, such as ports 1400, 1402. The port 1400 is coupled for communication to the processor 1378, such as via I/O controller 1390 for example. The ports 1400, 1402 may be any suitable port, such as but not limited to USB, USB-A, USB-B, USB-C, IEEE 1394 (Firewire), or Lightning™ connectors.

The mobile device 1343 is a suitable electronic device capable of accepting data and instructions, executing the instructions to process the data, and presenting the results. The mobile device 1343 includes one or more processing elements 1404. The processors may be microprocessors, field programmable gate arrays (FPGAs), digital signal processors (DSPs), and generally any device capable of performing computing functions. The one or more processors 1404 have access to memory 1406 for storing information.

The mobile device 1343 is capable of converting the analog voltage or current level provided by sensors 1408 and processor 1378. Mobile device 1343 uses the digital signals that act as input to various processes for controlling the scanner 1308. The digital signals represent one or more platform 1200 data including but not limited to distance to an object, images of the environment, acceleration, pitch orientation, roll orientation, yaw orientation, global position, ambient light levels, and altitude for example.

In general, mobile device 1343 accepts data from sensors 1408 and is given certain instructions for the purpose of generating or assisting the processor 1378 in the generation of a two-dimensional map or three-dimensional map of a scanned environment. Mobile device 1343 provides operating signals to the processor 1378, the sensors 1408 and a display 1410. Mobile device 1343 also accepts data from sensors 1408, indicating, for example, to track the position of the mobile device 1343 in the environment or measure coordinates of points on surfaces in the environment. The mobile device 1343 compares the operational parameters to predetermined variances (e.g. yaw, pitch or roll thresholds) and if the predetermined variance is exceeded, may generate a signal. The data received by the mobile device 1343 may be displayed on display 1410. In an embodiment, the display 1410 is a touch screen device that allows the operator to input data or control the operation of the scanner 1308.

The controller 368 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. additional scanners 1308 may also be connected to LAN with the controllers 1368 in each of these scanners 1308 being configured to send and receive data to and from remote computers and other scanners 1308. The LAN may be connected to the Internet. This connection allows controller 1368 to communicate with one or more remote computers connected to the Internet.

The processors 1404 are coupled to memory 1406. The memory 1406 may include random access memory (RAM) device, a non-volatile memory (NVM) device, and a read-only memory (ROM) device. In addition, the processors 1404 may be connected to one or more input/output (I/O) controllers 1412 and a communications circuit 1414. In an embodiment, the communications circuit 1414 provides an interface that allows wireless or wired communication with one or more external devices or networks, such as the LAN or the cellular network discussed above.

Controller 1368 includes operation control methods embodied in application code shown or described with reference to FIGS. 15-18. These methods are embodied in computer instructions written to be executed by processors 1378, 1404, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 1404 are the sensors 1408. The sensors 1408 may include but are not limited to: a microphone 1416; a speaker 1418; a front or rear facing camera 1420; accelerometers 1422 (inclinometers), gyroscopes 1424, a magnetometers or compass 1426; a global positioning satellite (GPS) module 1428; a barometer 1430; a proximity sensor 1432; and an ambient light sensor 1434. By combining readings from a combination of sensors 1408 with a fusion algorithm that may include a Kalman filter, relatively accurate position and orientation measurements can be obtained.

It should be appreciated that the sensors 1360, 1374 integrated into the scanner 1308 may have different characteristics than the sensors 1408 of mobile device 1343. For example, the resolution of the cameras 1360, 1420 may be different, or the accelerometers 1394, 1422 may have different dynamic ranges, frequency response, sensitivity (mV/g) or temperature parameters (sensitivity or range). Similarly, the gyroscopes 1396, 1424 or compass/magnetometer may have different characteristics. It is anticipated that in some embodiments, one or more sensors 1408 in the mobile device 1343 may be of higher accuracy than the corresponding sensors 1374 in the scanner 1308. As described in more detail herein, in some embodiments the processor 1378 determines the characteristics of each of the sensors 1408 and compares them with the corresponding sensors in the scanner 1308 when the mobile device. The processor 1378 then selects which sensors 1374, 1408 are used during operation. In some embodiments, the mobile device 1343 may have additional sensors (e.g. microphone 1416, camera 1420) that may be used to enhance operation compared to operation of the scanner 1308 without the mobile device 1343. In still further embodiments, the scanner 1308 does not include the IMU 1374 and the processor 1378 uses the sensors 1408 for tracking the position and orientation/pose of the scanner 1308. In still further embodiments, the addition of the mobile device 1343 allows the scanner 1308 to utilize the camera 1420 to perform three-dimensional (3D) measurements either directly (using an RGB-D camera) or using photogrammetry techniques to generate 3D maps. In an embodiment, the processor 1378 uses the communications circuit (e.g. a cellular 4G internet connection) to transmit and receive data from remote computers or devices.

In an embodiment, the scanner 1308 determines a quality attribute/parameter for the tracking of the scanner 1308 and/or the platform 1200. In an embodiment, the tracking quality attribute is a confidence level in the determined tracking positions and orientations to actual positions and orientations. When the confidence level crosses a threshold, the platform 1200 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the platform 1200, the scanner 1308, or the scanner 1510 for example.

In the exemplary embodiment, the scanner 1308 is a handheld portable device that is sized and weighted to be carried by a single person during operation. Therefore, the plane in which the 2D laser scanner 450 projects a light beam may not be horizontal relative to the floor or may continuously change as the computer moves during the scanning process. Thus, the signals generated by the accelerometers 1394, gyroscopes 1396 and compass 1398 (or the corresponding sensors 1408) may be used to determine the pose (yaw, roll, tilt) of the scanner 1308 and determine the orientation of the plane 1351.

In an embodiment, it may be desired to maintain the pose of the scanner 1308 (and thus the plane 1436) within predetermined thresholds relative to the yaw, roll and pitch orientations of the scanner 1308. In an embodiment, a haptic feedback device 1377 is disposed within the housing 1332, such as in the handle 1336. The haptic feedback device 1377 is a device that creates a force, vibration or motion that is felt or heard by the operator. The haptic feedback device 1377 may be, but is not limited to: an eccentric rotating mass vibration motor or a linear resonant actuator for example. The haptic feedback device is used to alert the operator that the orientation of the light beam from 2D laser scanner 1350 is equal to or beyond a predetermined threshold. In operation, when the IMU 1374 measures an angle (yaw, roll, pitch or a combination thereof), the controller 1368 transmits a signal to a motor controller 1438 that activates a vibration motor 1440. Since the vibration originates in the handle 1336, the operator will be notified of the deviation in the orientation of the scanner 1308. The vibration continues until the scanner 1308 is oriented within the predetermined threshold or the operator releases the actuator 1338. In an embodiment, it is desired for the plane 1436 to be within 10-15 degrees of horizontal (relative to the ground) about the yaw, roll and pitch axes.

Figure 15:
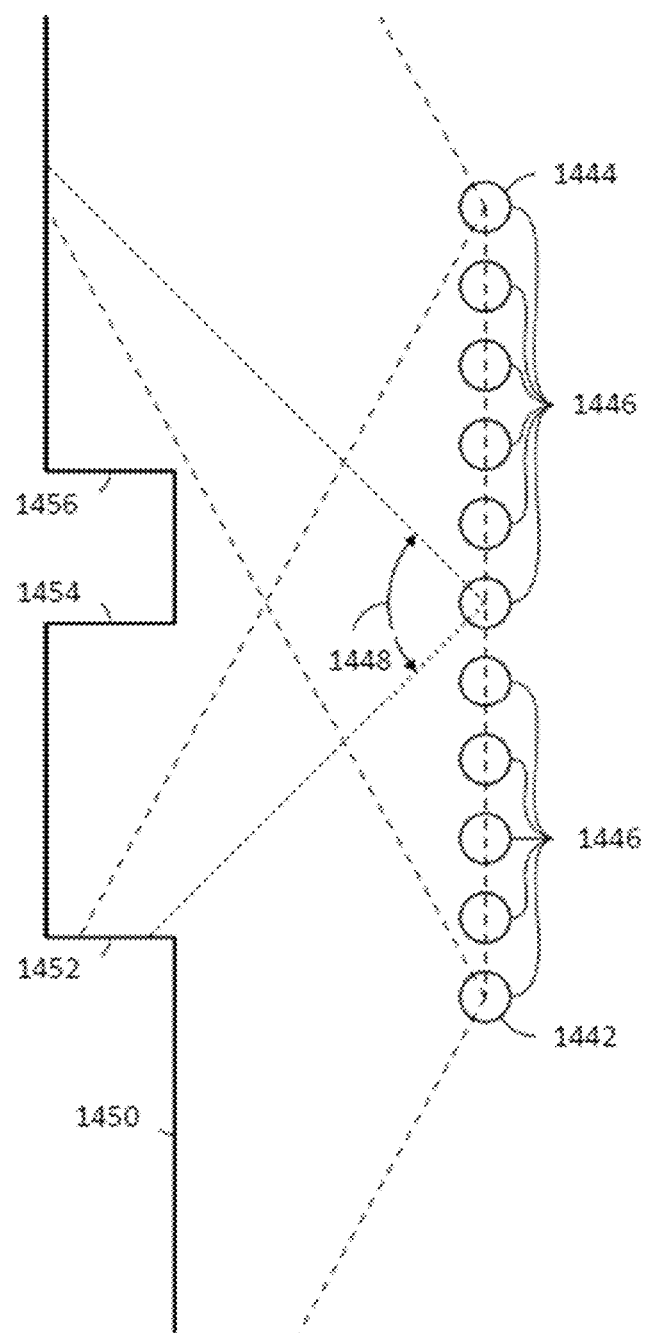
FIG. 15-17 are schematic illustrations of the operation of system of FIG. 13 in accordance with an embodiment.

In an embodiment, the 2D laser scanner 1350 makes measurements as the platform 1200 is moved about an environment, such from a first position 1442 to a second registration position 1444 as shown in FIG. 15. In an embodiment, 2D scan data is collected and processed as the scanner 1308 passes through a plurality of 2D measuring positions 1446. At each measuring position 1446, the 2D laser scanner 1450 collects 2D coordinate data over an effective FOV 1448. Using methods described in more detail below, the controller 1368 uses 2D scan data from the plurality of 2D scans at positions 1446 to determine a position and orientation of the scanner 1308 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D laser scanner 1350.

Figure 16:
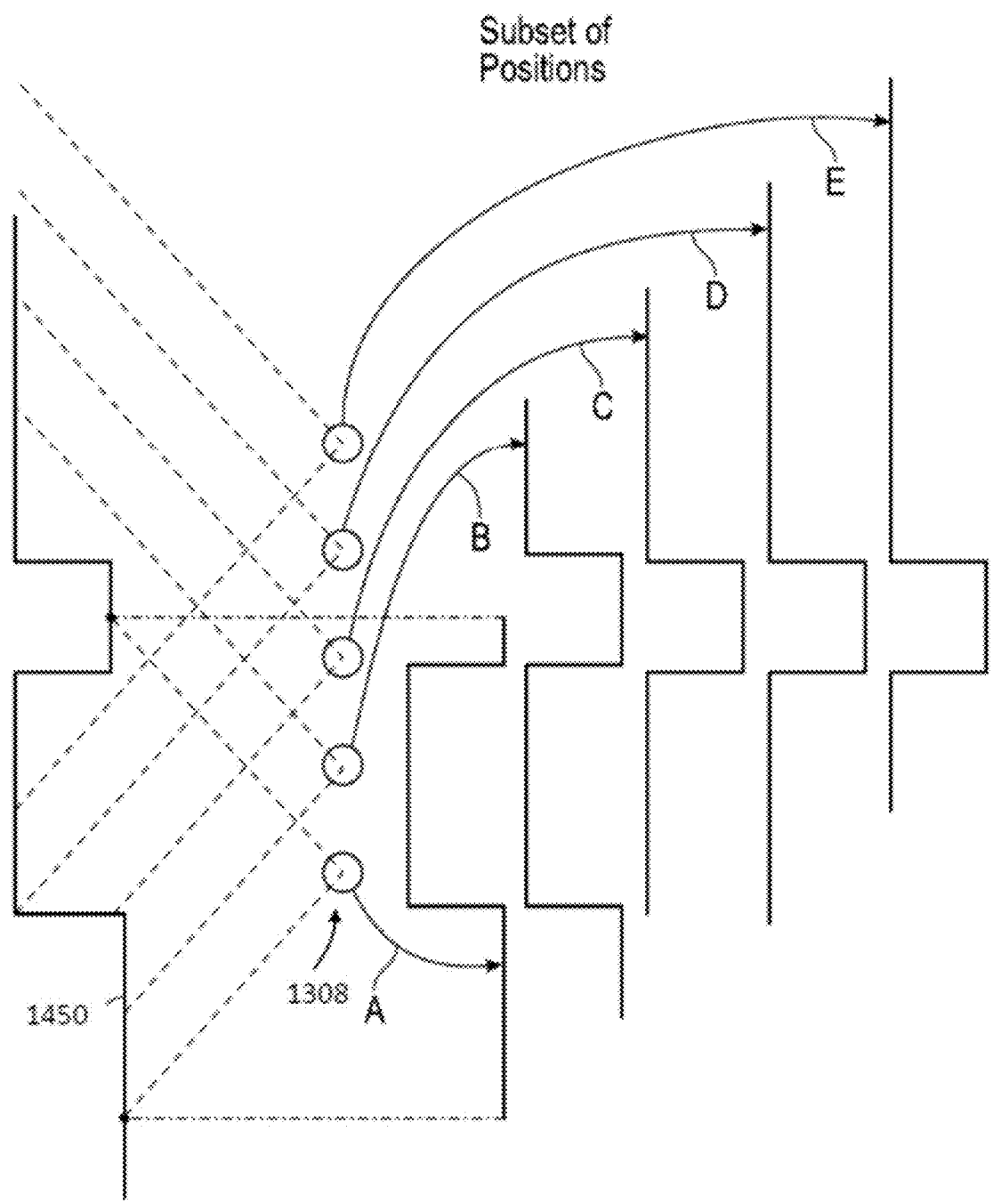
Figures 17, 18:
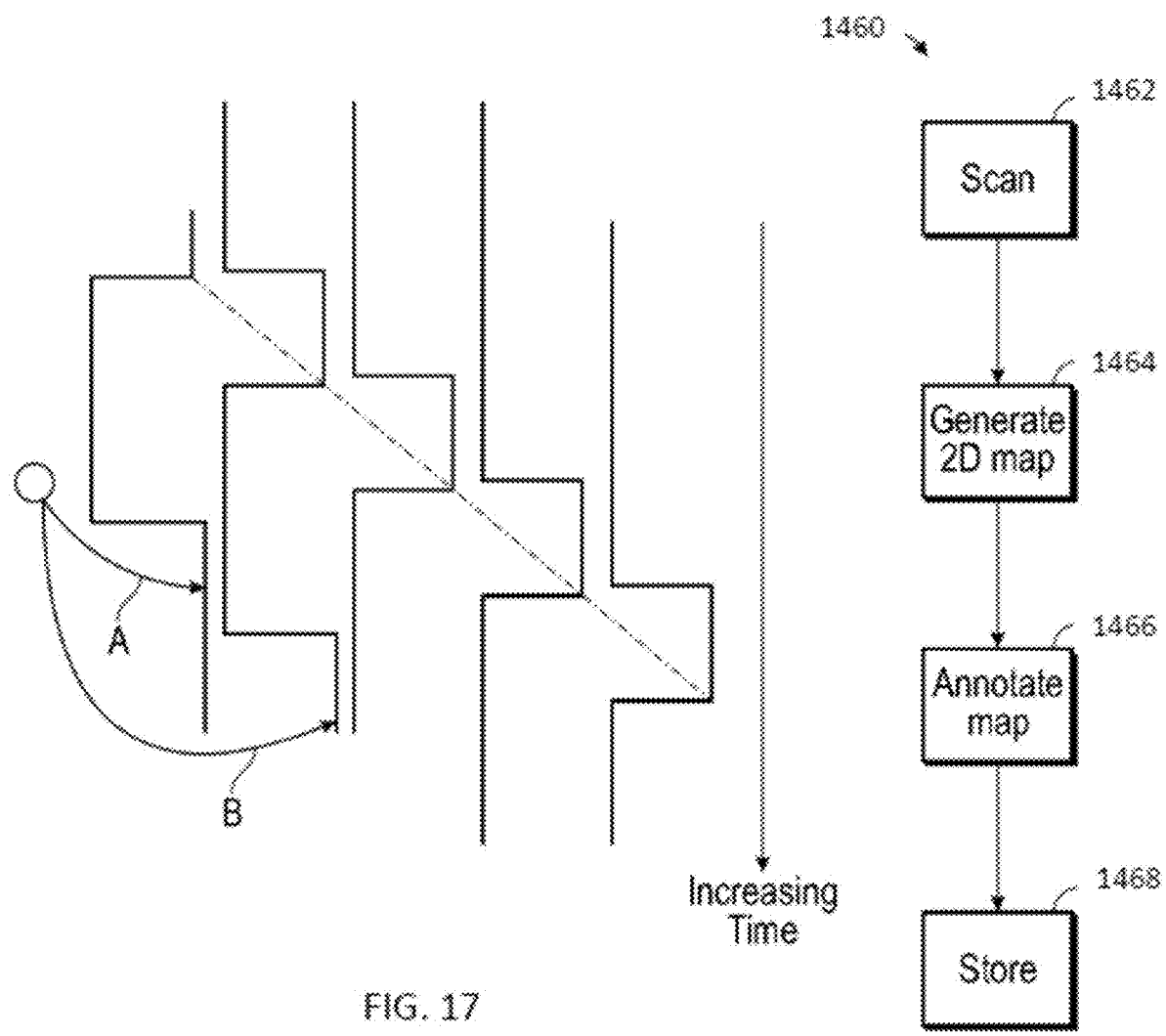
FIG. 18 is a flow diagram of a method of generating a two-dimensional map of an environment.

FIG. 17 shows the 2D scanner 1308 collecting 2D scan data at selected positions 1446 over an effective FOV 1448. At different positions 1446, the 2D laser scanner 1350 captures a portion of the object 1450 marked A, B, C, D, and E (FIG. 16). FIG. 17 shows 2D laser scanner 1350 moving in time relative to a fixed frame of reference of the object 1450.

FIG. 17 includes the same information as FIG. 16 but shows it from the frame of reference of the scanner 1308 rather than the frame of reference of the object 1450. FIG. 17 illustrates that in the scanner 1308 frame of reference, the position of features on the object change over time. Therefore, the distance traveled by the scanner 1308 can be determined from the 2D scan data sent from the 2D laser scanner 1350 to the controller 1368.

As the 2D laser scanner 1350 takes successive 2D readings and performs best-fit calculations, the controller 1368 keeps track of the translation and rotation of the 2D laser scanner 1350, which is the same as the translation and rotation of the scanner 1308. In this way, the controller 1368 is able to accurately determine the change in the values of x, y, θ as the scanner 1308 moves from the first position 1442 to the second position 1444.

In an embodiment, the controller 1368 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 1452, 1454, and 1456 shown in FIG. 15. The mathematical criterion may involve processing of the raw data provided by the 2D laser scanner 1350 to the controller 1368, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane of the light beam from 2D laser scanner 1350 remains horizontal relative to the ground plane, the first translation value is dx, the second translation value is dy, and the first rotation value dθ. If the first scan data is collected with the 2D laser scanner 1350 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 468 is further configured to determine a third translation value (for example, dz) and a second and third rotation values (for example, pitch and roll). The third translation value, second rotation value, and third rotation value may be determined based at least in part on readings from the IMU 1374.

The 2D laser scanner 1350 collects 2D scan data starting at the first position 1442 and more 2D scan data at the second position 1444. In some cases, these scans may suffice to determine the position and orientation of the scanner 1308 at the second position 1444 relative to the first position 1442. In other cases, the two sets of 2D scan data are not sufficient to enable the controller 1368 to accurately determine the first translation value, the second translation value, and the first rotation value. This problem may be avoided by collecting 2D scan data at intermediate scan positions 1446. In an embodiment, the 2D scan data is collected and processed at regular intervals, for example, once per second. In this way, features in the environment are identified in successive 2D scans at positions 1446. In an embodiment, when more than two 2D scans are obtained, the controller 1368 may use the information from all the successive 2D scans in determining the translation and rotation values in moving from the first position 1442 to the second position 1444. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the scanner 1308 is moved beyond the second position 1444, a two-dimensional image or map of the environment being scanned may be generated. It should further be appreciated that in addition to generating a 2D map of the environment, the data from scanner 1308 may be used to generate (and store) a 2D trajectory of the scanner 1308 as it is moved through the environment. In an embodiment, the 2D map and/or the 2D trajectory may be combined or fused with data from other sources in the registration of measured 3D coordinates. It should be appreciated that the 2D trajectory may represent a path followed by the 2D scanner 1308.

Referring now to FIG. 17, a method 1460 is shown for generating a two-dimensional map with annotations. The method 1460 starts in block 1462 where the facility or area is scanned to acquire scan data 1470. The scanning is performed by carrying the scanner 1308 through the area to be scanned. The scanner 1308 measures distances from the scanner 1308 to an object, such as a wall for example, and also a pose of the scanner 1308 in an embodiment the user interacts with the scanner 1308 via actuator 1438. In the illustrated embodiments, the mobile device 1343 provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 1472 or an open door 1474 for example. Therefore, the scan data 1470 may include additional information that is not desired in a 2D map or layout of the scanned area.

The method 1460 then proceeds to block 1464 where a 2D map 1476 is generated of the scanned area. The generated 2D map 1476 represents a scan of the area, such as in the form of a floor plan without the artifacts of the initial scan data. It should be appreciated that the 2D map 1476 represents a dimensionally accurate representation of the scanned area that may be used to determine the position and pose of the mobile scanning platform 1200 in the environment to allow the registration of the 3D coordinate points measured by the 3D measurement device 1210. In the embodiment of FIG. 18, the method 1460 then proceeds to block 1466 where optional user-defined annotations are made to the 2D maps 1476 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). In an embodiment, the annotation may also be used to define scan locations where the mobile scanning platform 1200 stops and uses the 3D scanner 1210 to perform a stationary scan of the environment.

Once the annotations of the 2D annotated map are completed, the method 1460 then proceeds to block 1468 where the 2D map is stored in memory, such as nonvolatile memory 1387 for example. The 2D map may also be stored in a network accessible storage device or server so that it may be accessed by the desired personnel.

Figure 19A:
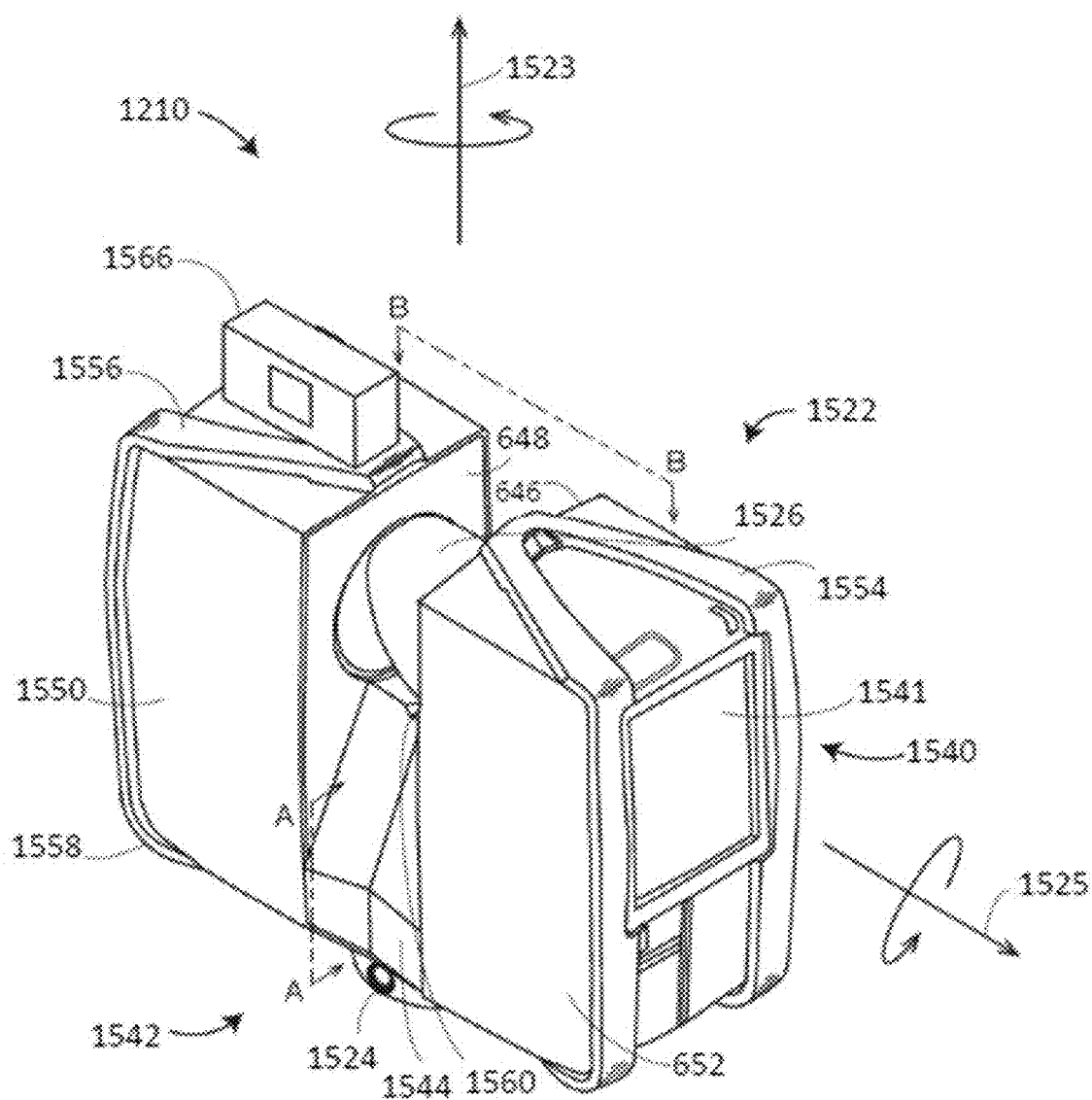
FIGS. 19A-19C are views of a time-of-flight laser scanner for use with the mobile scanning platform of FIG. 12 in accordance with an embodiment.
Figure 19B:
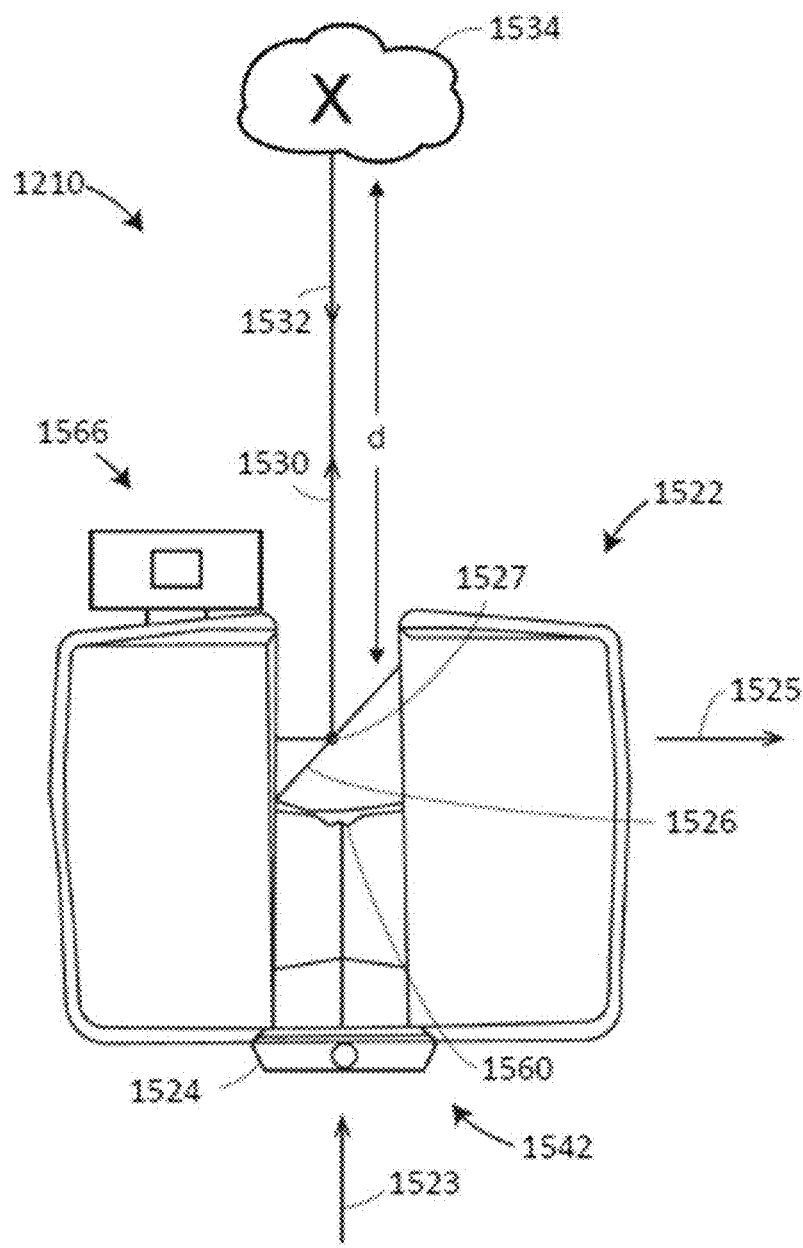
Figure 19C:
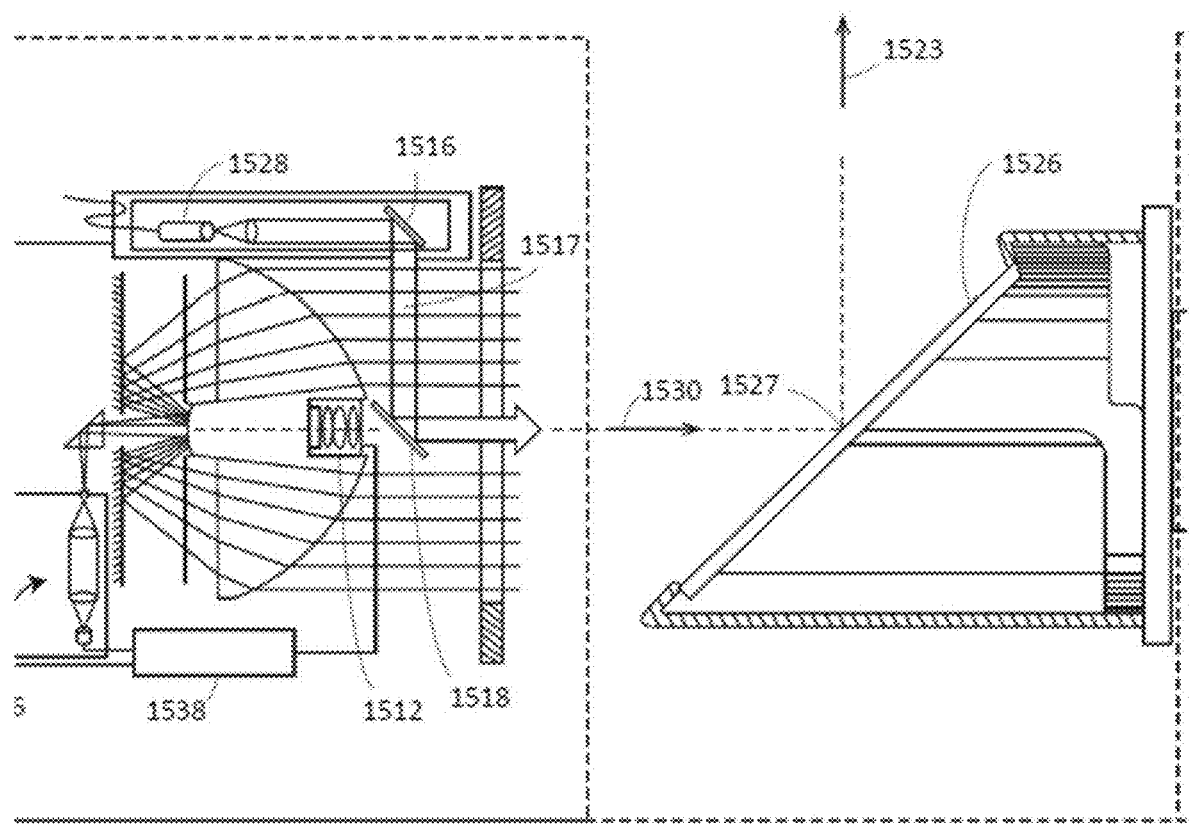

Referring now to FIGS. 19A-19C, an embodiment is shown of a laser scanner 1510. In this embodiment, the laser scanner 1210 has a measuring head 1522 and a base 1524. The measuring head 1522 is mounted on the base 1524 such that the laser scanner 1210 may be rotated about a vertical axis 1523. In one embodiment, the measuring head 1522 includes a gimbal point 1527 that is a center of rotation about the vertical axis 1523 and a horizontal axis 1525. The measuring head 1522 has a rotary mirror 1526, which may be rotated about the horizontal axis 1525. The rotation about the vertical axis may be about the center of the base 1524. In one embodiment, the vertical axis 1523 is coaxial with the center axis of the post 1209. The terms vertical axis and horizontal axis refer to the scanner in its normal upright operating position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 1522 is further provided with an electromagnetic radiation emitter, such as light emitter 1528, for example, that emits an emitted light beam 1530. In one embodiment, the emitted light beam 1530 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 1530 is amplitude or intensity modulated, for example, with a sinusoidal waveform or with a rectangular waveform. The emitted light beam 1530 is emitted by the light emitter 1528 onto a beam steering unit, such as mirror 1526, where it is deflected to the environment. A reflected light beam 1532 is reflected from the environment by an object 1534. The reflected or scattered light is intercepted by the rotary mirror 1526 and directed into a light receiver 1536. The directions of the emitted light beam 1530 and the reflected light beam 1532 result from the angular positions of the rotary mirror 1526 and the measuring head 1522 about the axes 1525, 1523, respectively. These angular positions in turn depend on the corresponding rotary drives or motors.

Coupled to the light emitter 1528 and the light receiver 1536 is a controller 1538. The controller 1538 determines, for a multitude of measuring points X, a corresponding number of distances d between the laser scanner 1210 and the points X on object 1534. The distance to a particular point X is determined based at least in part on the speed of light in air through which electromagnetic radiation propagates from the device to the object point X. In one embodiment the phase shift of modulation in light emitted by the laser scanner 1210 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the 3D measurement device 1210 takes place by rotating the rotary mirror 1526 relatively quickly about axis 1525 while rotating the measuring head 1522 relatively slowly about axis 1523, thereby moving the assembly in a spiral pattern. This is sometimes referred to as a compound mode of operation. In an exemplary embodiment, the rotary mirror rotates at a maximum speed of 5820 revolutions per minute. For such a scan, the gimbal point 1527 defines the origin of the local stationary reference system. The base 1524 rests in this local stationary reference system. In other embodiments, another mode of operation is provided wherein the 3D measurement device 1210 rotates the rotary mirror 1526 about the axis 1525 while the measuring head 1522 remains stationary. This is sometimes referred to as a helical mode of operation.

In an embodiment, the acquisition of the 3D coordinate values further allows for the generation of a 3D trajectory, such as the 3D trajectory (e.g. 3D path) of the gimbal point 1527 for example. This 3D trajectory may be stored and combined or fused with other data, such as data from the 2D scanner and/or from an inertial measurement unit for example, and used to register 3D coordinate data. It should be appreciated that the 3D trajectory may be transformed from the gimbal point 1527 to any other location on the system, such as the base unit.

In addition to measuring a distance d from the gimbal point 1527 to an object point X, the laser scanner 1210 may also collect gray-scale information related to the received optical power (equivalent to the term "brightness.") The gray-scale value may be determined at least in part, for example, by integration of the bandpass-filtered and amplified signal in the light receiver 636 over a measuring period attributed to the object point X.

The measuring head 1522 may include a display device 1540 integrated into the laser scanner 1210. The display device 1540 may include a graphical touch screen 1541, which allows the operator to set the parameters or initiate the operation of the laser scanner 1210. For example, the screen 1541 may have a user interface that allows the operator to provide measurement instructions to the device, and the screen may also display measurement results.

The laser scanner 1210 includes a carrying structure 1542 that provides a frame for the measuring head 1522 and a platform for attaching the components of the laser scanner 1210. In one embodiment, the carrying structure 1542 is made from a metal such as aluminum. The carrying structure 1542 includes a traverse member 1544 having a pair of walls 1546, 1548 on opposing ends. The walls 1546, 1548 are parallel to each other and extend in a direction opposite the base 1524. Shells 1550, 1552 are coupled to the walls 1546, 1548 and cover the components of the laser scanner 1210. In the exemplary embodiment, the shells 1550, 1552 are made from a plastic material, such as polycarbonate or polyethylene for example. The shells 1550, 1552 cooperate with the walls 1546, 1548 to form a housing for the laser scanner 1210.

On an end of the shells 1550, 1552 opposite the walls 1546, 1548 a pair of yokes 1554, 1556 are arranged to partially cover the respective shells 1550, 1552. In the exemplary embodiment, the yokes 1554, 1556 are made from a suitably durable material, such as aluminum for example, that assists in protecting the shells 1550, 52 during transport and operation. The yokes 1554, 1556 each includes a first arm portion 1558 that is coupled, such as with a fastener for example, to the traverse 1544 adjacent the base 1524. The arm portion 1558 for each yoke 1554, 1556 extends from the traverse 1544 obliquely to an outer corner of the respective shell 1550, 1552. From the outer corner of the shell, the yokes 1554, 1556 extend along the side edge of the shell to an opposite outer corner of the shell. Each yoke 1554, 1556 further includes a second arm portion that extends obliquely to the walls 1546, 1548. It should be appreciated that the yokes 1554, 1556 may be coupled to the traverse 1544, the walls 1546, 1548 and the shells 1550, 1554 at multiple locations.

In an embodiment, on top of the traverse 1544, a prism 1560 is provided. The prism extends parallel to the walls 1546, 1548. In the exemplary embodiment, the prism 1560 is integrally formed as part of the carrying structure 1542. In other embodiments, the prism 1560 is a separate component that is coupled to the traverse 1544. When the mirror 1526 rotates, during each rotation the mirror 1526 directs the emitted light beam 1530 onto the traverse 1544 and the prism 1560. In some embodiments, due to non-linearities in the electronic components, for example in the light receiver 1536, the measured distances d may depend on signal strength, which may be measured in optical power entering the scanner or optical power entering optical detectors within the light receiver 1536, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 1536. Since the prism 1560 is at a known distance from the gimbal point 1527, the measured optical power level of light reflected by the prism 1560 may be used to correct distance measurements for other measured points, thereby allowing for compensation to correct for the effects of environmental variables such as temperature. In the exemplary embodiment, the resulting correction of distance is performed by the controller 1538.

In an embodiment, the base 1524 is coupled to a swivel assembly (not shown) such as that described in commonly owned U.S. Pat. No. 8,705,012 ('012), which is incorporated by reference herein. The swivel assembly is housed within the carrying structure 1542 and includes a motor that is configured to rotate the measuring head 1522 about the axis 1523. In an embodiment, the angular/rotational position of the measuring head 622 about the axis 1523 is measured by angular encoder. In the embodiments disclosed herein, the base (with or without the swivel assembly) may be mounted to the post 1209.

An auxiliary image acquisition device 1566 may be a device that captures and measures a parameter associated with the scanned area or the scanned object and provides a signal representing the measured quantities over an image acquisition area. The auxiliary image acquisition device 1566 may be, but is not limited to, a pyrometer, a thermal imager, an ionizing radiation detector, or a millimeter-wave detector. In an embodiment, the auxiliary image acquisition device 1566 is a color camera.

In an embodiment, a central color camera (first image acquisition device) 1512 is located internally to the scanner and may have the same optical axis as the 3D scanner device. In this embodiment, the first image acquisition device 1512 is integrated into the measuring head 1522 and arranged to acquire images along the same optical pathway as emitted light beam 1530 and reflected light beam 1532. In this embodiment, the light from the light emitter 1528 reflects off a fixed mirror 1516 and travels to dichroic beam-splitter 518 that reflects the light 1517 from the light emitter 1528 onto the rotary mirror 1526. In an embodiment, the mirror 1526 is rotated by a motor 1537 and the angular/rotational position of the mirror is measured by angular encoder 1534. The dichroic beam-splitter 1518 allows light to pass through at wavelengths different than the wavelength of light 1517. For example, the light emitter 1528 may be a near infrared laser light (for example, light at wavelengths of 780 nm or 1150 nm), with the dichroic beam-splitter 1518 configured to reflect the infrared laser light while allowing visible light (e.g., wavelengths of 400 to 700 nm) to transmit through. In other embodiments, the determination of whether the light passes through the beam-splitter 1518 or is reflected depends on the polarization of the light. The digital camera 1512 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 1523 and by steering the mirror 1526 about the axis 1525. One or both of the color cameras 1512, 1566 may be used to colorize the acquired 3D coordinates (e.g. the point cloud).

In an embodiment, when the 3D scanner is operated in compound mode, a compound compensation may be performed to optimize the registration of date by combining or fusing sensor data (e.g. 2D scanner, 3D scanner and/or IMU data) using the position and orientation (e.g. trajectory) of each sensor.

It should be appreciated that while embodiments herein refer to the 3D scanner 1210 as being a time-of-flight (phase shift or pulsed) scanner, this is for exemplary purposes and the claims should not be so limited. In other embodiments, other types of 3D scanners may be used, such as but not limited to structured light scanners, area scanners, triangulation scanners, photogrammetry scanners, or a combination of the foregoing.

Figure 20:
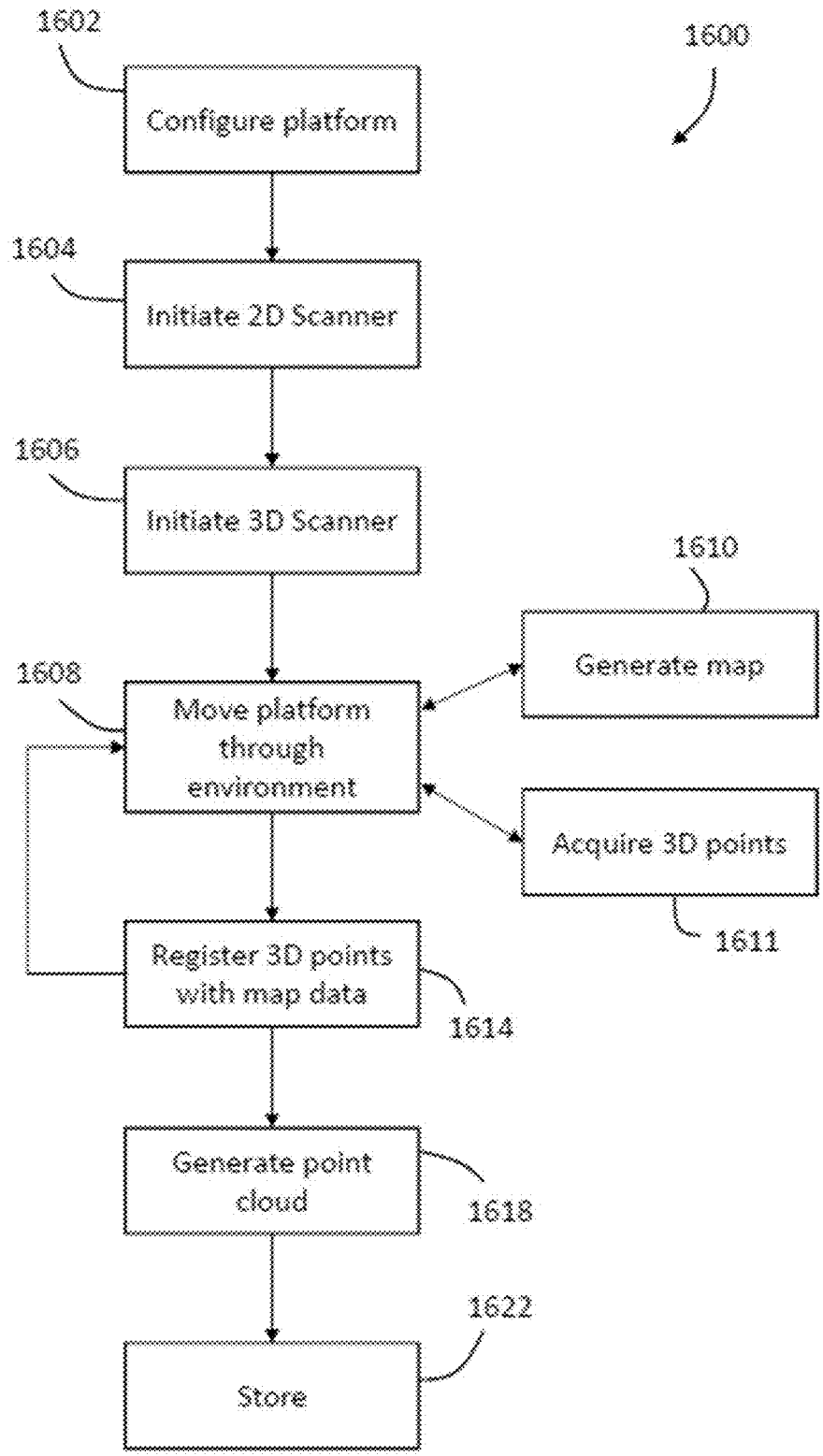
FIG. 20 is a flow diagram of a method of scanning an environment using the mobile scanning platform of FIG. 12.
Figure 21:
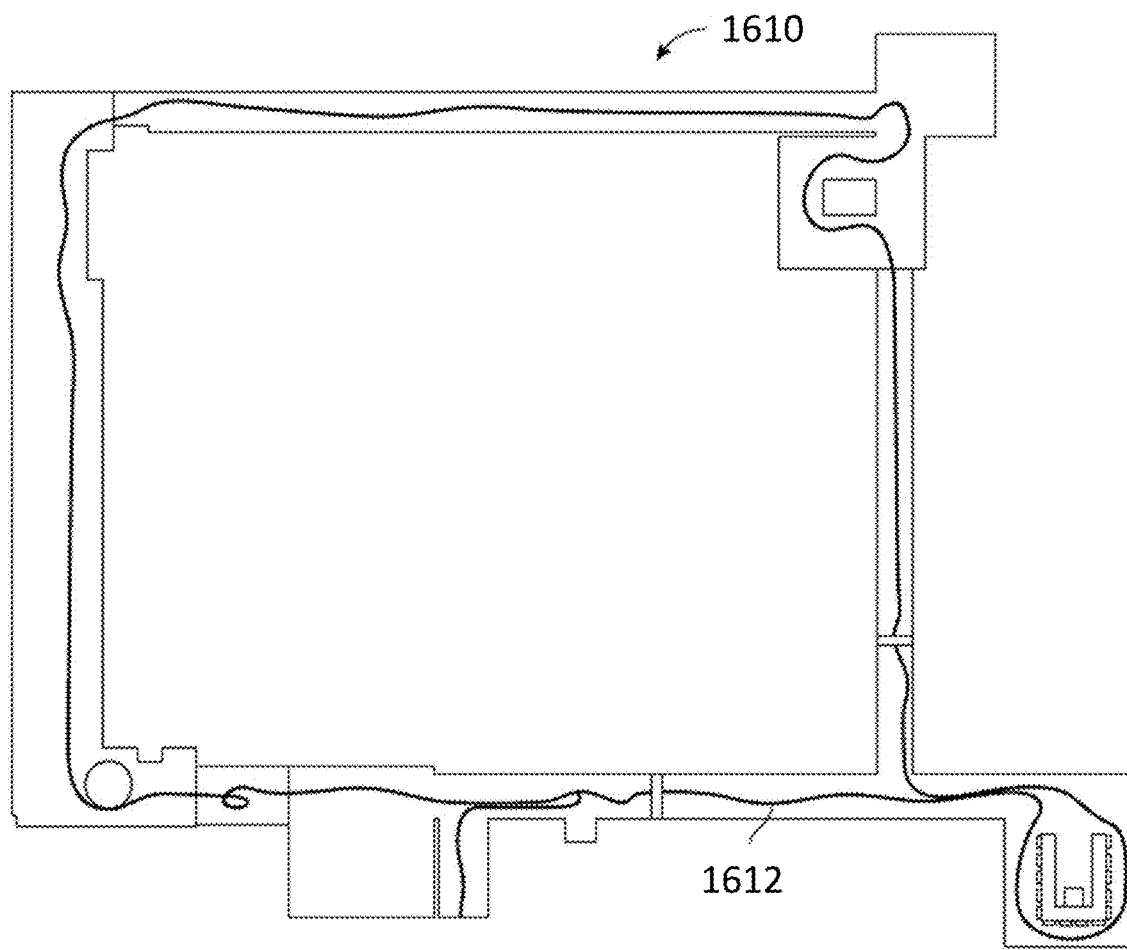
FIG. 21 is a schematic illustration of a map generated by a mobile scanning platform showing a trajectory.

Referring now to FIGS. 20-21, an embodiment is shown of a method 1600 for scanning an environment with the mobile scanning platform 1200. The method 1600 starts in block 1602 where the platform is configured. In the embodiment where the platform is platform 1200, the configuring may include attaching the 2D scanner 1308 to the respective arm or holder, and the 3D measurement device 1210 to the post 1209. In an embodiment where the platform is semi-autonomous or fully autonomous, the configuring may include determining a path for the platform 1200 to follow and defining stationary scan locations (if desired). In an embodiment, the path may be determined using the system and method described in commonly owned U.S. patent application Ser. No. 16/154,240, the contents of which are incorporated by reference herein. Once the path is defined, the 2D scanner 1308 and 3D scanner 1210 may be coupled to the platform 1200. It should be appreciated that in some embodiments, the platform 1200 may be remotely controlled by an operator and the step of defining a path may not be performed.

Once the platform 1200 is configured, the method 1600 proceeds to block 1604 where the 2D scanner 1308 is initiated and the 3D measurement device 1210 is initiated in block 1606. It should be appreciated that when operation of the 2D scanner 1308 is initiated, the 2D scanner starts to generate a 2D map of the environment as described herein. Similarly, when operation of the 3D measurement device 1210 is initiated, the coordinates of 3D points in the environment are acquired in a volume about the 3D scanner.

The method 1600 then proceeds to block 1608 where the platform 1200 is moved through the environment. As the platform 1200 is moved, both the 2D scanner 1308 and the 3D measurement device 1210 continue to operate. This results in the generation of both a 2D map 1610 (FIG. 21) and the acquisition of 3D points 1611. In an embodiment, as the 2D map is generated, the location or path 1612 of the platform 1200 is indicated on the 2D map. In an embodiment, the platform 1200 may include a user interface that provides feedback to the operator during the performing of the scan. In an embodiment, a quality attribute (e.g. scan density) of the scanning process may be determined during the scan. When the quality attribute crosses a threshold (e.g. scan density too low), the user interface may provide feedback to the operator. In an embodiment, the feedback is for the operator to perform a stationary scan with the 3D scanner.

The method 1600 then proceeds to block 1614 where the acquired 3D coordinate points are registered into a common frame of reference. It should be appreciated that since the platform 1200 is moving while the 3D measurement device 1210 is acquiring data, the local frame of reference of the 3D scanner is also changing. Using the position and pose data from the 2D scanner 1308, the frame of reference of the acquired 3D coordinate points may be registered into a global frame of reference. In an embodiment, the registration is performed as the platform 1200 is moved through the environment. In another embodiment, the registration is done when the scanning of the environment is completed.

The registration of the 3D coordinate points allows the generation of a point cloud (e.g. a collection of 3D coordinates or points in 3D space) in block 1618. In an embodiment, a representation of the path 1620 of the platform 1200 is shown in the point cloud 1616. In some embodiments, the point cloud 1616 is generated and displayed to the user as the platform 1200 moves through the environment being scanned. In these embodiments, blocks 1608, 1614, 1618 may loop continuously until the scanning is completed. With the scan complete, the method 1600 ends in block 1622 where the point cloud 1616 and 2D map 1610 are stored in memory of a controller or processor system The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system comprising:
a coordinate scanner configured to optically measure and determine a plurality of three-dimensional coordinates to a plurality of locations on at least one surface in the environment, the coordinate scanner being sized to be carried by a single person and moved through the environment while acquiring the plurality of three-dimensional coordinates;
a display removably coupled to the coordinate scanner, the display having a graphical user interface;
one or more processors configured to:
determine a quality attribute of a process of measuring the plurality of three-dimensional coordinates based at least in part on the movement of the coordinate scanner in the environment; and
display a graphical quality indicator on the graphical user interface based at least in part on the quality attribute, the quality indicator is a graphical element having at least one movable element;
wherein the graphical element further comprises a quality symbol, the at least one changeable bar indicating a first quality attribute, the quality symbol indicating a second quality attribute;
wherein the first quality attribute is based at least in part on the speed of the coordinate scanner, and the second quality attribute is based at least in part on a target attribute; and
wherein the target attribute is the age of the target, the age of the target being the number of successive images a natural feature or artificial target appear in a plurality of successive images acquired by the coordinate scanner.

2. The system of claim 1, wherein the size of the movable element is based on the quality attribute.

3. The system of claim 1, wherein the at least one movable element includes a plurality of stacked bars in the movable element.

4. The system of claim 1, wherein the graphical element further comprises a quality symbol, the one or more processors being further configured to change the quality symbol based on the quality attribute.

5. The system of claim 1, wherein the parameter is one of a length of the at least one movable element, a color of the at least one movable element, or a combination thereof.

6. The system of claim 1, wherein:
the graphical element is a first color when the process of measuring the plurality of three-dimensional coordinates with the coordinate scanner provides a density of the plurality of three-dimensional coordinates above a first threshold;
the graphical element is a second color when the process of measuring the plurality of three-dimensional coordinates with the coordinate scanner provides the density of the plurality of three-dimensional coordinates below a second threshold; and
the graphical element is a third color when the process of measuring the plurality of three-dimensional coordinates with the coordinate scanner provides the density of the plurality of three-dimensional coordinates being between the first threshold and the second threshold.

7. The system of claim 1, wherein the quality attribute is based at least in part on a translational speed of the coordinate scanner through the environment.

8. The system of claim 1, wherein the quality attribute is based at least in part on at least one of: a number of tracking targets; an age of the targets; a rotational speed of the coordinate scanner; a quality threshold of images used to track the coordinate scanner; a number of three-dimensional points acquired; a 3D geometry of the environment; a distance to the objects being scanned; and a level of noise in the plurality of three-dimensional coordinates.

9. The system of claim 1, wherein the graphical user interface includes a first portion and a second portion, the quality indicator being positioned in the first portion.

10. The system of claim 1, wherein the quality indicator instructs the operator to perform a stationary scan.

11. The system of claim 1, wherein the quality indicator instructs the operator to perform an anchor scan.

12. The system of claim 1, wherein the quality indicator instructs the operator to record an anchor object.

13. The system of claim 1, wherein the one or more processors are further configured to determine when tracking has been lost, and displaying on the graphical user interface two overlapping transparent images of the environment.

* * * * *